United States Patent [19]
Davies

[11] Patent Number: 5,741,990
[45] Date of Patent: Apr. 21, 1998

[54] METHOD OF AND MEANS FOR PRODUCING MUSICAL NOTE RELATIONSHIPS

[75] Inventor: Peter Max Crofts Davies, Northants, Great Britain

[73] Assignee: Notepool, Ltd., Kettering, United Kingdom

[21] Appl. No.: 882,361

[22] Filed: Jun. 25, 1997

Related U.S. Application Data

[63] Continuation of Ser. No. 590,181, Jan. 23, 1996, abandoned, which is a continuation-in-part of Ser. No. 500,144, Jul. 10, 1995, abandoned, which is a continuation of Ser. No. 132,694, Oct. 6, 1993, abandoned, which is a division of Ser. No. 761,775, Aug. 14, 1991, Pat. No. 5,415,071.

[30] Foreign Application Priority Data

Feb. 17, 1989 [GB] United Kingdom .................... 8903672
Feb. 16, 1990 [WO] WIPO ...................... PCT/GB90/00263

[51] Int. Cl.[6] ..................................................... G10C 3/12
[52] U.S. Cl. .............................. 84/423 R; 84/424; 84/425
[58] Field of Search ............................... 84/423 R, 424, 84/425

[56] References Cited

U.S. PATENT DOCUMENTS

| | | | |
|---|---|---|---|
| 0,826,661 | 7/1906 | Hofbauer | 84/423 R |
| 1,202,882 | 10/1916 | Nordbo | 84/424 |
| 2,003,894 | 6/1935 | Luedtke | 84/423 R |
| 2,049,564 | 8/1936 | Hintermeyer | 84/423 R |
| 2,159,491 | 5/1939 | Rose | 84/423 R |
| 2,250,522 | 1/1941 | Bonilla | 84/423 R |
| 2,701,498 | 2/1955 | Koch et al. | 84/423 R |
| 3,012,460 | 12/1961 | Wilson | 84/423 R |
| 3,342,094 | 9/1967 | Wilson | 84/423 R |
| 3,572,205 | 3/1971 | Scholfield | 84/474 |
| 3,592,099 | 7/1971 | Gibby | 84/473 |
| 3,677,130 | 7/1972 | Petreycik | 84/471 |

(List continued on next page.)

FOREIGN PATENT DOCUMENTS

| | | |
|---|---|---|
| 2602957 | 10/1976 | Germany. |
| 2131592 | 2/1982 | United Kingdom. |
| 2119153 | 4/1982 | United Kingdom. |
| 8810483 | 12/1988 | WIPO. |

*Primary Examiner*—Eddie C. Lee
*Attorney, Agent, or Firm*—Biebel & French

[57] ABSTRACT

In a method of and means for producing musical note relationships there is provided an array of staggered lines or rows or columns of symbols, in which each symbol represents a musical note. Each line may comprise a repeated series of twelve symbols forming a musical series of semitones known as a chromatic scale, and each line is staggered with respect to adjacent lines such that groups of the symbols which represent the same musical note relationship, such as intervals, scales, chords, etc., form the same visual configuration, for example diagonal configurations or vertical configurations at respective locations in the array. The array may comprise a keyboard including a plurality of keys each representative of a particular musical note. Each line may comprise generally vertical columns of keys in which any given key in a given column and the key immediately above it in that column produce an interval of a fifth, whilst the two keys on either side of the given column which lie between the given key and the key immediately above it form intervals of a minor third and a major third respectively with the given key. The keyboard may be incorporated in a keyboard device including means for successively scanning each of the keys and for generating first signals indicative of the state of play of each key, and microprocessor means for receiving and correlating the first signals and for generating second signals indicative of musical sequences represented by the states of play of the keys. The device may also include output means for conveying the second signals to sound generating means to produce sound indicative of the musical sequences.

12 Claims, 34 Drawing Sheets

U.S. PATENT DOCUMENTS

| | | | |
|---|---|---|---|
| 3,748,947 | 7/1973 | Freiheit | 84/485 |
| 3,752,031 | 8/1973 | Mohos | 84/471 |
| 3,791,254 | 2/1974 | Muller | 84/471 |
| 3,908,506 | 9/1975 | Leonard | 84/471 |
| 4,031,800 | 6/1977 | Thompson | 84/423 R |
| 4,069,737 | 1/1978 | Anderson | 84/485 SR |
| 4,175,468 | 11/1979 | Whitlock | 84/485 SR |
| 4,677,893 | 7/1987 | Fahnestock | 84/473 |
| 5,088,378 | 2/1992 | DeLaTorre | 84/470 R |

CHORDS:
Major, M7, M9, M11, M13    Minor, m7, m9, m11, m13.    Dom 7, 9, 11, 13.    Diminished. Augmented.

FIG. 9A

| C# | D | Eb | E | F | F# | G | Ab | A |
|---|---|---|---|---|---|---|---|---|
| Bb | B | C | C# | D | Eb | E | F | F# |
| F# | G | Ab | A | Bb | B | C | C# | D |
| Eb | E | F | F# | G | Ab | A | Bb | B |
| B | C | C# | D | Eb | E | F | F# | G |
| Ab | A | Bb | B | C | C# | D | Eb | E |
| E | F | F# | G | Ab | A | Bb | B | C |

FIG. 9B

| F# | G | Ab | A | Bb | B | C | C# | D | Eb | E |
|---|---|---|---|---|---|---|---|---|---|---|
| Bb | B | C | C# | D | Eb | E | F | F# | G | Ab |
| Eb | E | F | F# | G | Ab | A | Bb | B | C | C# |
| Ab | A | Bb | B | C | C# | D | Eb | E | F | F# |
| C# | D | Eb | E | F | F# | G | Ab | A | Bb | B |
| F# | G | Ab | A | Bb | B | C | C# | D | Eb | E |
| B | C | C# | D | Eb | E | F | F# | G | Ab | A |
| E | F | F# | G | Ab | A | Bb | B | C | C# | D |
| Ab | A | Bb | B | C | C# | D | Eb | E | F | F# |
| C# | D | Eb | E | F | F# | G | Ab | A | Bb | B |
| F# | G | Ab | A | Bb | B | C | C# | D | Eb | E |

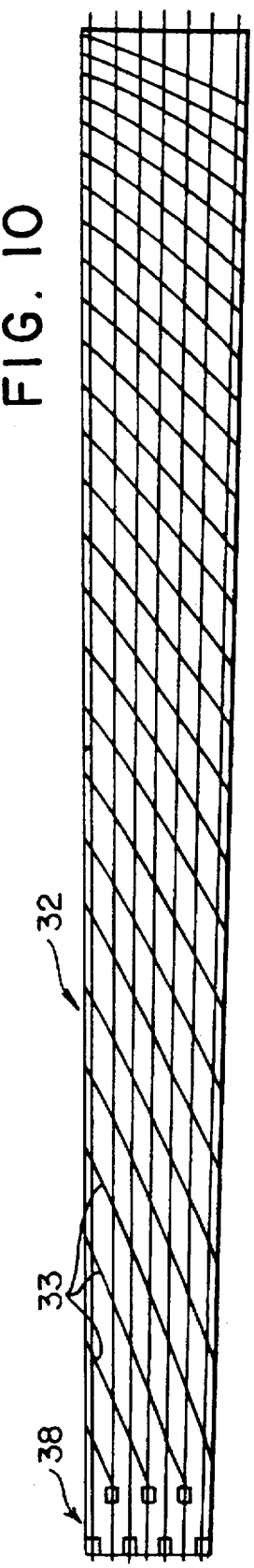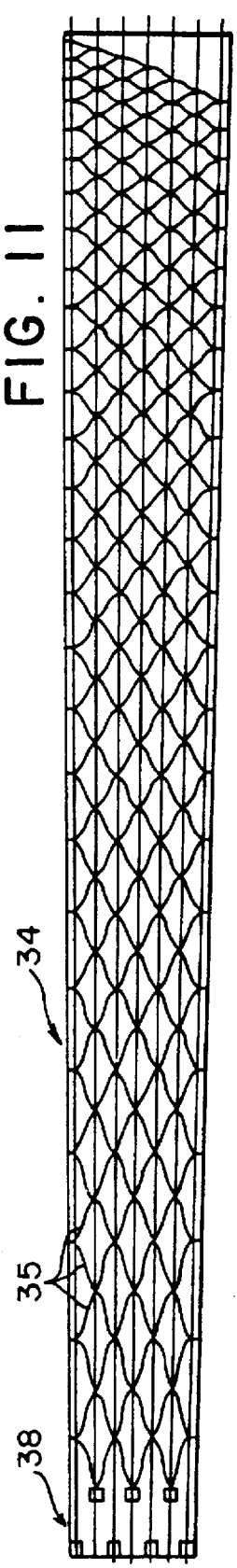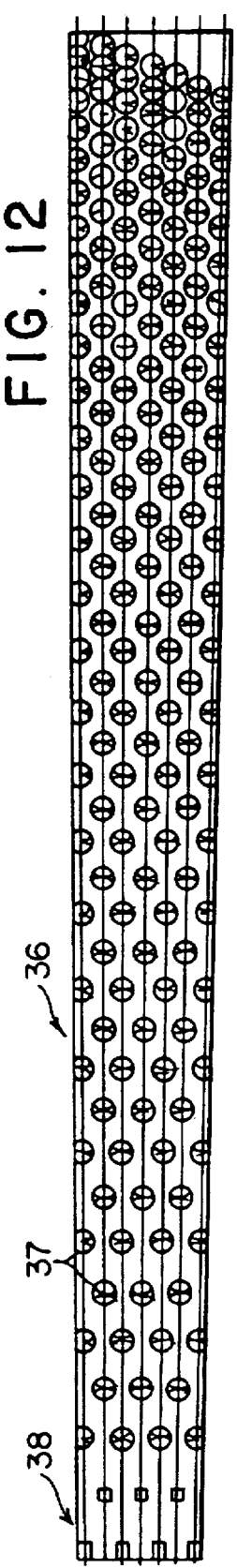

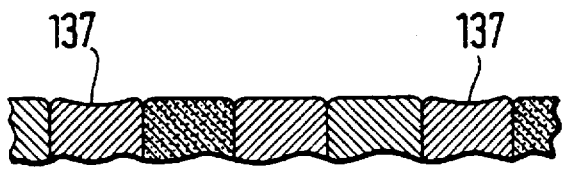
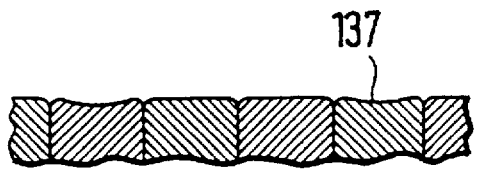
*Fig.31b*        *Fig.31c*
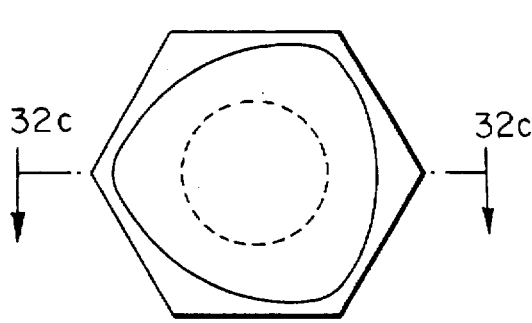
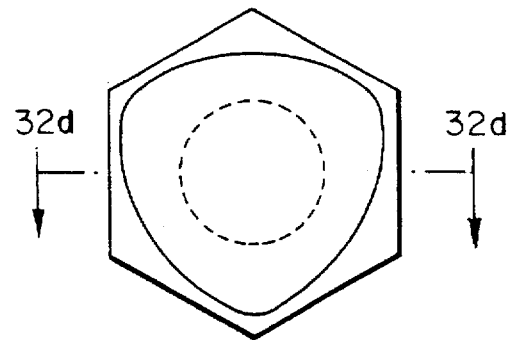
FIG-32a        FIG-32b
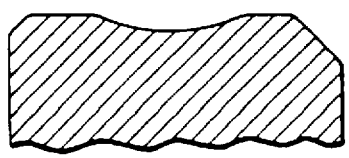
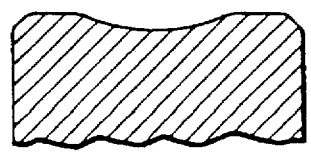
FIG-32c        FIG-32d

METHOD OF AND MEANS FOR PRODUCING MUSICAL NOTE RELATIONSHIPS

CROSS-REFERENCE TO RELATED APPLICATIONS

This application is a Continuation of Ser. No. 08/590,181, filed Jan. 23, 1996 (now abandoned), which is a Continuation-In-Part of Ser. No. 08/500,144 filed Jul. 10, 1995 (now abandoned), which is a Continuation of Ser. No. 08/132,694 filed Oct. 6, 1993 (now abandoned), which is a Division of Ser. No. 07/761,775 filed Aug. 14, 1991 (now U.S. Pat. No. 5,415,071).

BACKGROUND OF THE INVENTION

This invention relates to a method of and means for producing musical note relationships, and in particular to such relationships which consist of groups of musical notes forming musical intervals, scales, chords, etc in different musical keys.

To become a competent musician, it is necessary to learn and remember all musical note relationships, whose interactions together form the rudiments of musical theory. Such note relationships are conventionally taught in an audible manner, with scant visual information to aid understanding. For those students who are naturally musically orientated, such learning may be relatively easy. However, for many students, it can prove to be extremely difficult to remember individual note relationships and understand how they are interconnected.

Furthermore, while all the note relationships are being learnt, it is necessary to learn how these are applied in the playing of a particular musical instrument. For example, it is necessary to learn all the finger positions on a keyboard of the piano or a fingerboard of a guitar, which must be used to make the instrument play the required note relationships in all musical keys. Not only are such finger positions generally different for different types of instrument, but they also vary from one key to another on any one instrument, so that the playing of each key has to be mastered separately.

SUMMARY OF THE INVENTION

It is an object of the present invention to provide a method of and means for producing musical note relationships which enables such relationships to be understood and learnt more easily than has been possible hitherto and which may also be used to simplify the learning of many musical instruments.

In a method of producing musical note relationships a plurality of symbols each representing a musical note are arranged into an array, wherein groups of said symbols, which represent the same musical note relationship in different musical keys, form the same visual configuration at respective locations within the array, said array consisting of rows of said symbols, any given row being arranged relative to an adjacent row such that successive symbols of said given row each lies substantially between two successive symbols of said adjacent row, said successive symbols of each row representing the musical notes of a chromatic scale; the respective configurations thus formed for the musical note relationships are identified; and, for each symbol of said given row which lies substantially between two successive symbols of said adjacent row, the two successive symbols represent notes which form musical intervals with the note represented by said symbol of a major third and minor third respectively.

A device for producing musical note relationships, in accordance with the invention, comprises means bearing an array of symbols, each symbol representing a musical note and the symbols being arranged such that groups of said symbols, which represent the same musical note relationship in different musical keys, form the same visual configuration at respective locations within the array, said array consisting of rows of said symbols, any given row being arranged relative to an adjacent row such that successive symbols of said given row each lies substantially between two successive symbols of said adjacent row, said successive symbols of each row representing the musical notes of a chromatic scale, wherein for each symbol of said given row which lies substantially between two successive symbols of said adjacent row, the two successive symbols represent notes which form musical intervals with the note represented by said symbol of a major third and minor third respectively.

The rows may be arranged in horizontal rows with the symbols arranged such that each semi-tone of a row is positioned between the fourth and fifth semi-tone in the row immediately above it when counting in a direction to the right from the same semi-tone in that row, this semitone being counted as the first, and is positioned between the fourth and fifth semi-tone in the row immediately below it when counting in a direction to the left from the same semi-tone in that row.

In this way, three clearly defined rows of notes, i.e. horizontal rows of semi-tones, diagonal rows of minor thirds and diagonal rows of major thirds are produced, which all cross one another at approximately 60°. All other intervals, scales, chords, etc., used in music theory appear, in particular configurations, at specific locations within the array in relation to every note.

In a musical instrument according to the invention and comprising a plurality of contact positions each for use in generating an audible musical note, said contact positions are arranged in an array wherein groups of said contact positions which may be used to generate the same musical note relationship in different musical keys form the same visual configuration at respective locations within the array, said array consisting of rows of the contact positions, any given row being arranged relative to an adjacent row such that successive contact positions of said given row each lies substantially between two successive contact positions of said adjacent row, the contact positions of each row being arranged such that successive contact positions generate a musical chromatic scale, wherein for each contact position of said given row which lies substantially between two successive contact positions of said adjacent row, the two successive contact positions are for generating audible musical notes which form musical intervals with the musical note generated by the said contact position of a major third and minor third respectively.

The musical instrument may be for example a stringed instrument with the contact positions being defined by a number of strings tensioned across a fingerboard of the instrument.

In another example, the instrument may be a keyboard instrument with the contact positions being defined by the keys of the keyboard. In one arrangement of a keyboard for a musical instrument, the keyboard comprises a plurality of keys arranged in a two-dimensional array and means associated with each key for producing a signal indicative of a particular musical note, said array consisting of generally parallel columns of said keys in which any given column is arranged relative to an adjacent column which is immediately to one side of said given column such that successive keys of said given column each lies substantially between two successive keys of said adjacent column, and wherein said means associated with any given key of said given column are adapted to produce a signal indicative of a first musical note, said means associated with a key immediately above said given key of said given column are adapted to produce a signal indicative of a second musical note, and said means associated with keys which lie between said given key and the key immediately above it and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

In another arrangement, a keyboard for a musical instrument comprises a plurality of keys arranged in a two-dimensional array and means associated with each key for producing a signal indicative of a particular musical note, said array consisting of generally parallel rows of said keys in which any given row is arranged relative to an adjacent row which is immediately to one side of said given row such that successive keys of said given row each lies substantially between two successive keys of said adjacent row, and wherein said means associated with successive keys of each row are adapted to produce signals indicative of successive semi-tones of a musical chromatic scale, said means associated with any given key of said given row being adapted to produce a signal indicative of a first semi-tone and said means associated with two successive keys of an adjacent row with said given key lying therebetween being adapted to produce signals indicative of second and third semi-tones respectively, such that musical intervals formed by said first and second semi-tones and said first and third semi-tones comprise a major third and a minor third respectively.

The rows may be arranged in horizontal rows of semi-tones with the contact positions arranged such that each note of a line of semi-tones is positioned between the fourth and fifth note in the row of semi-tones immediately above it when counting in a direction to the right from the same note in that row, and is positioned between the fourth and fifth note in the row immediately below it when counting in a direction to the left from the same note in that row.

The present invention may be utilised in many different forms, for example written or printed charts, computer software, or mechanical devices such as slide rules, which can indicate the specific configurations, within the array, which provide the musical note relationships. Thus, as a learning aid, the present invention provides easy access to musical information which is often hard to absorb and understand in a conventional manner. The shifting frames of reference which characterise musical harmony are a constant source of confusion which the present invention clarifies by its symmetry. Furthermore, when applied to a musical instrument, it provides a way of positioning notes on a keyboard or fingerboard, for example, in such a way that the player of an instrument can easily see all the harmonic possibilities and play them with equal ability in all musical keys. The visual arrangements of the notes on these instruments clarifies the learning process and, because there is no bias towards a particular musical key, the present invention facilitates more flexible playing than on conventional instruments where up to twelve musical keys need to be learnt separately before flexible playing is possible.

BRIEF DESCRIPTION OF THE DRAWINGS

The invention will now be described by way of examples with reference to the accompanying drawings, wherein.

DESCRIPTION OF THE PREFERRED EMBODIMENTS

FIGS. 1 to 6 show a two-dimensional array of well known musical symbols, which each represent a musical note in known manner. The array consists of a number of horizontal rows, for example as shown by reference 1, with each row including repeated series of twelve symbols from A to G♯/A♭, which each represent a musical note and together form a musical series of semi-tones, otherwise known as a chromatic scale, giving rise to twelve different musical keys. It can be seen that each note is placed between its major and minor third notes in the row immediately above it. For example, the note A in the second row from the top of the array is positioned between the notes C and C♯/D♭ in the top row of the array. In other words, each note is placed between the fourth and fifth note in the adjacent row immediately above it, when counting in a direction to the right from the same note in that adjacent row, or is placed between the fourth and fifth note in the adjacent row immediately below it, when counting in a direction to the left from that same note in that adjacent row. In both cases, the same note in the adjacent row is counted as the first note. For example, note A in the second row from the top of the array is between the notes C and C♯/D♭ in the top row, which are the fourth and fifth notes to the right of note A in the top row. Similarly, note A in the second row is also between the notes F♯/G♭ and F in the third row of the array, which are the fourth and fifth notes to the left of note A in the third row.

Figure 1:
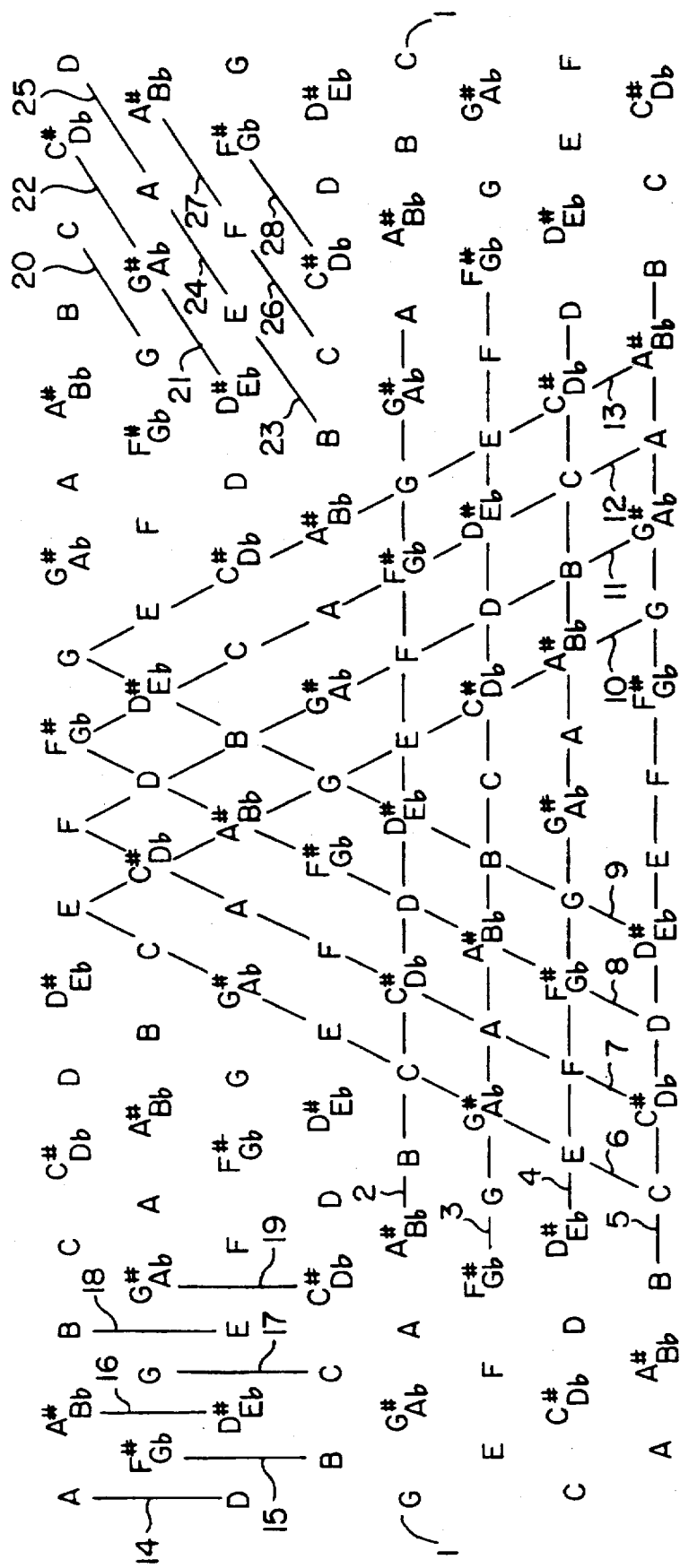
FIGS. 1 to 6 show an array of symbols, each representing a musical note and being arranged in accordance with the invention.

In FIG. 1, it can be seen that four horizontal configurations 2 to 5 respectively show four scales of semi-tones starting with the notes A♯/B♭, F♯/G♭, D♯/E♭, and B, respectively. Similarly, diagonal configurations 6 to 9, extending in a first diagonal direction slanting to the right of the array determine major thirds starting with the notes C, C♯/D♭, D, D♯/E♭, respectively, and diagonal configurations 10 to 13 extending in a second diagonal direction slanting to the left of the array determine minor thirds starting with the notes G, G♯/A♭, A, A♯/B♭, respectively. Also, in FIG. 1, the vertical configurations 14 to 19 each show fifths from D to A, B to F♯/G♭, D♯/E♭ to A♯/B♭, etc, and the diagonal configurations 20 to 28 each show fourths from G to C, D♯/E♭ to G♯/A♭ to C♯/D♭, etc.

Figure 2:
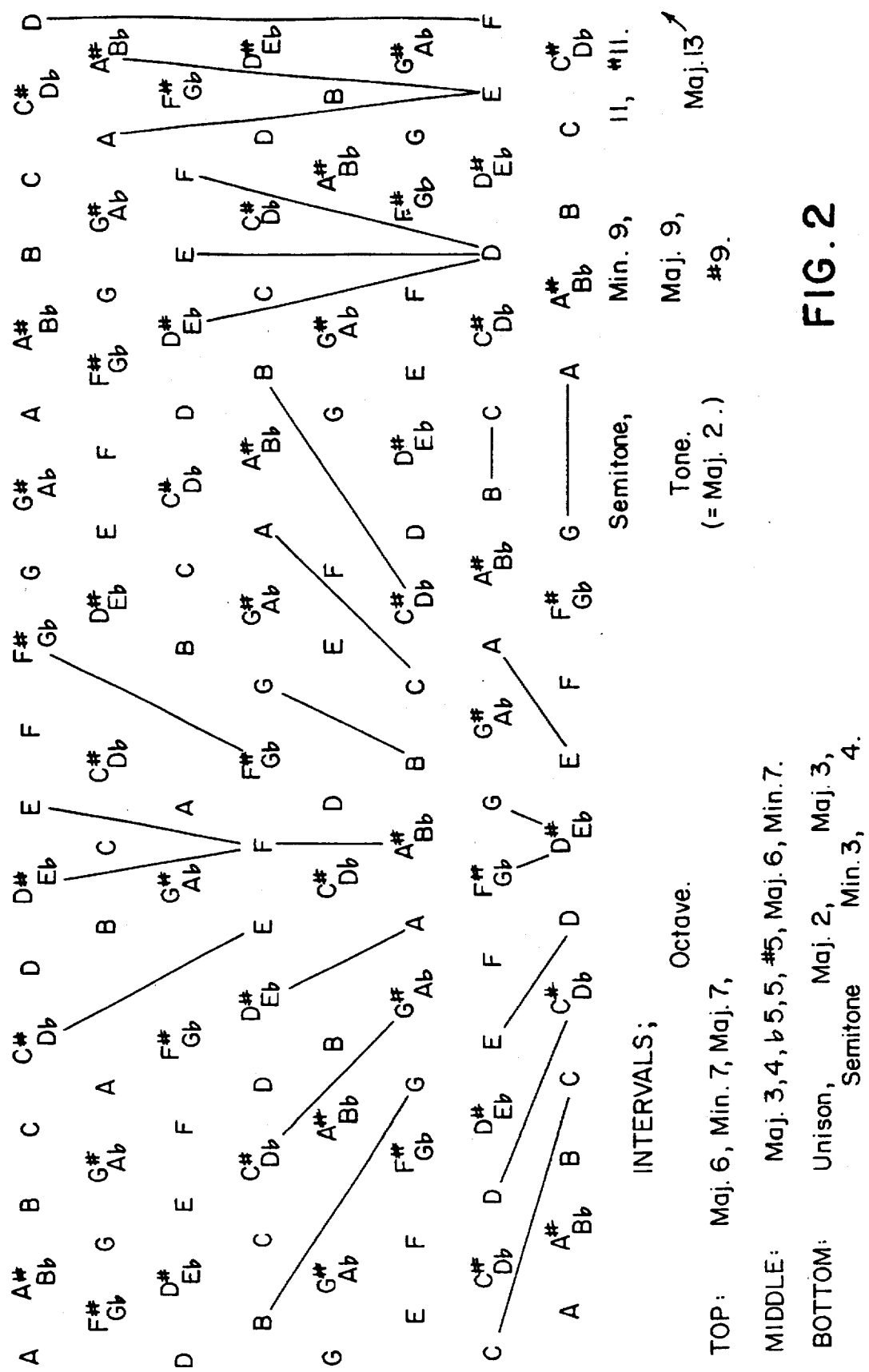
Figure 3:
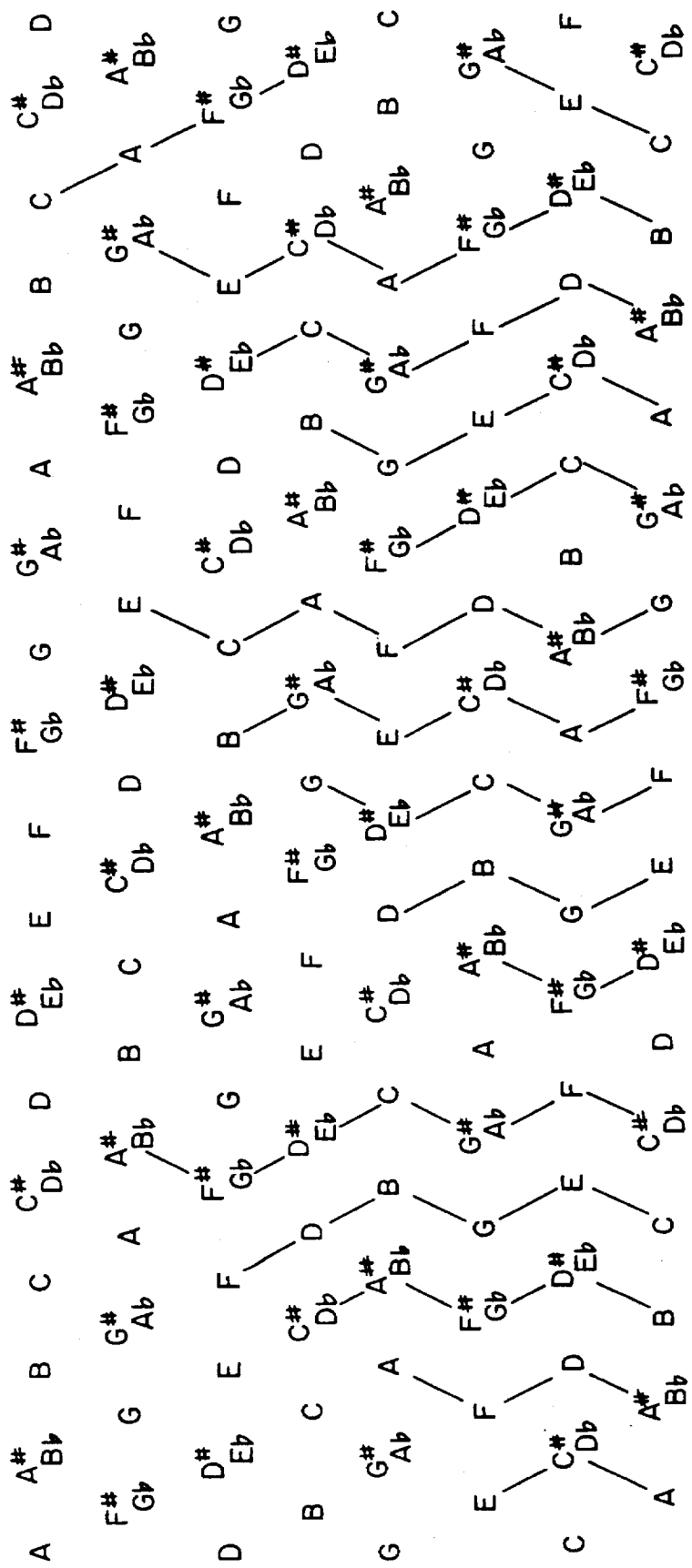
Figure 4:
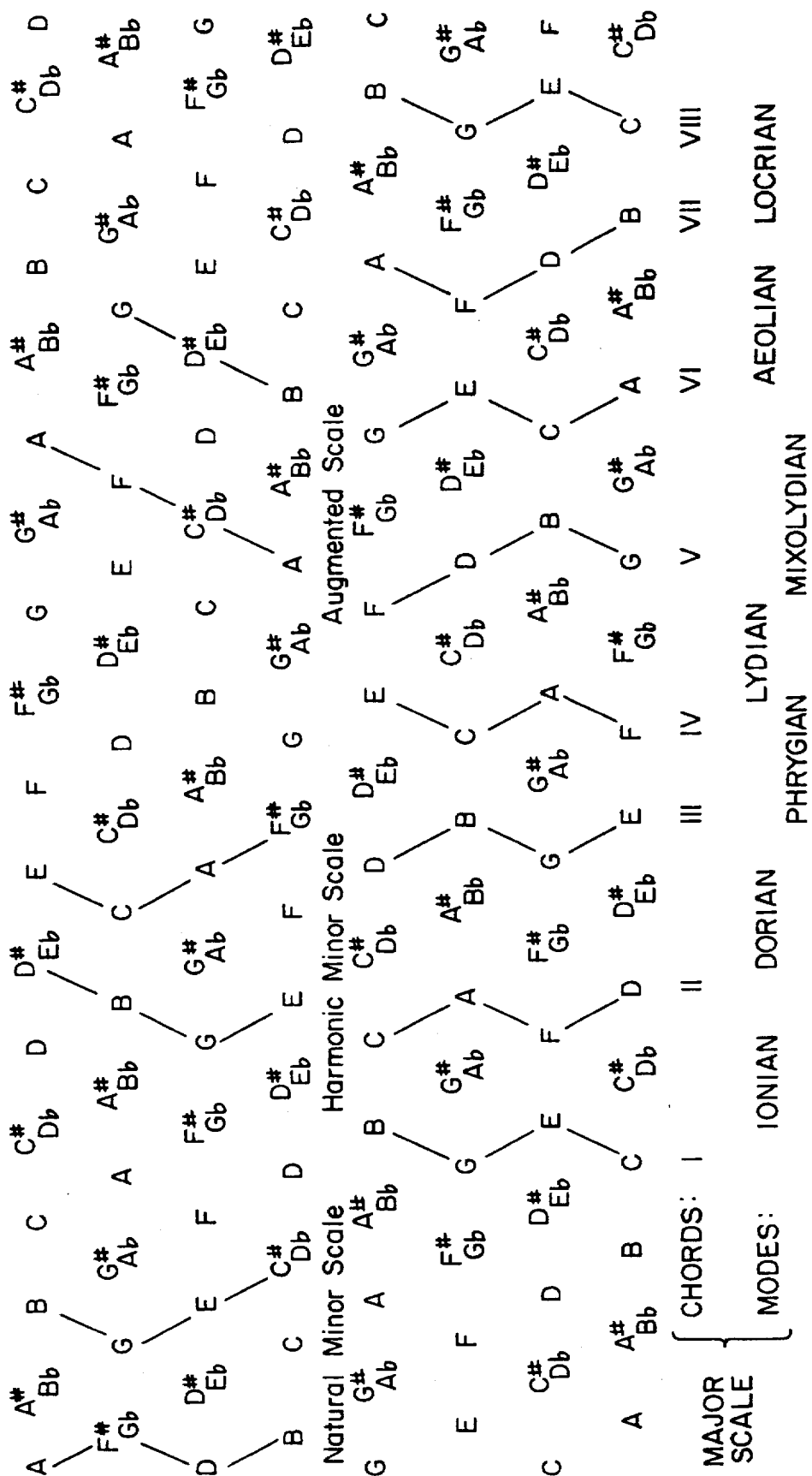

In a similar manner, FIG. 2 shows examples of interconnecting configurations within the array, which each determine a different musical interval. FIG. 3 shows examples of configurations, which determine chords in specific musical keys. In FIG. 4, the top half of the array shows examples of configurations, which respectively determine natural minor, harmonic minor, and augmented scales in specific musical keys.

These configurations are each read in horizontal pairs from the bottom left of the configuration to top right, i.e. the harmonic minor scale in the key of E consists of E, F♯/G♭, G, A, B, C, D♯/E♭, E. The lower half of the array in FIG. 4 shows an example of a configuration forming a major scale with its seven modes and eight chords derived from this scale.

Figure 5:
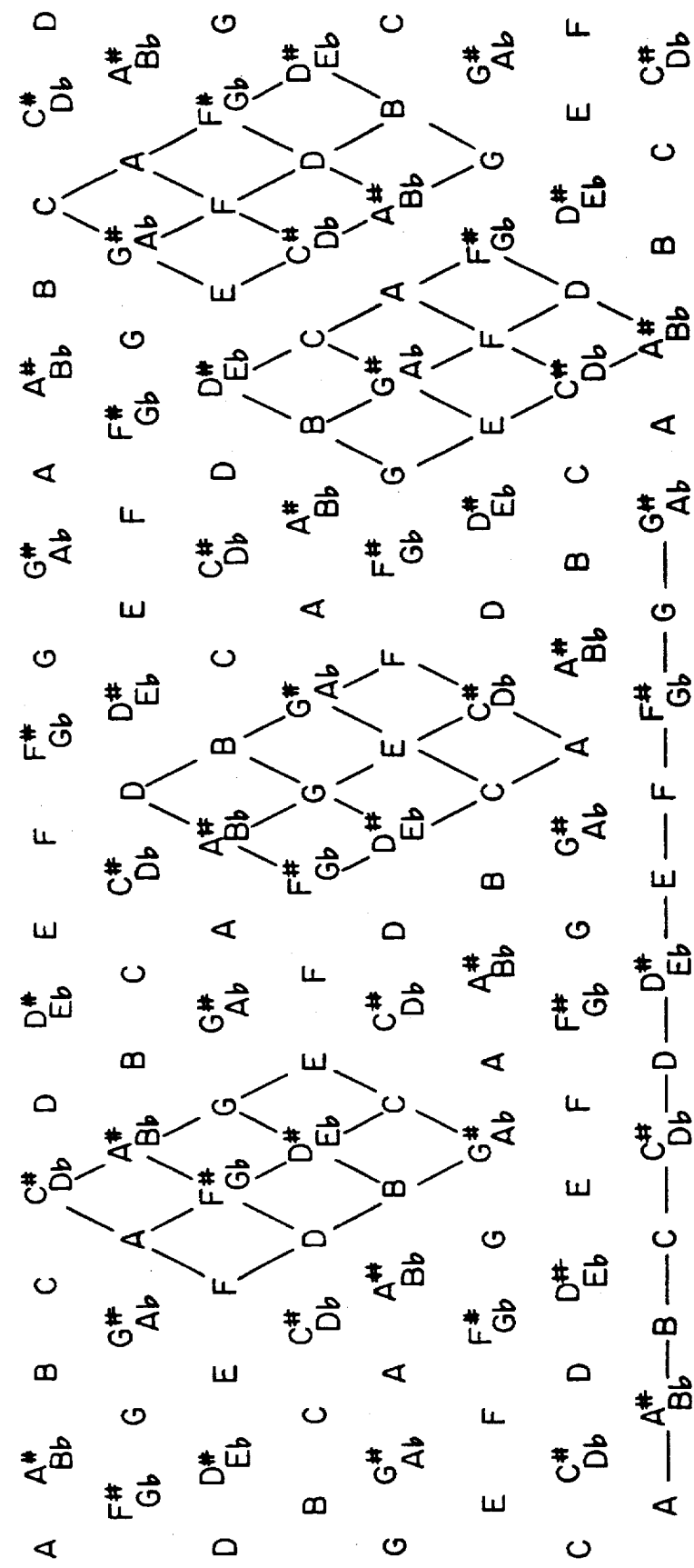

It can be seen from FIG. 5 that a configuration in the form of a parallelogram at any location within the array shows three diminished and four augmented chords in crossing rows of major and minor thirds, and every parallelogram thus formed contains the complete series of twelve semi-tones shown in the connected horizontal line at the bottom of the array in FIG. 5.

Figure 6:
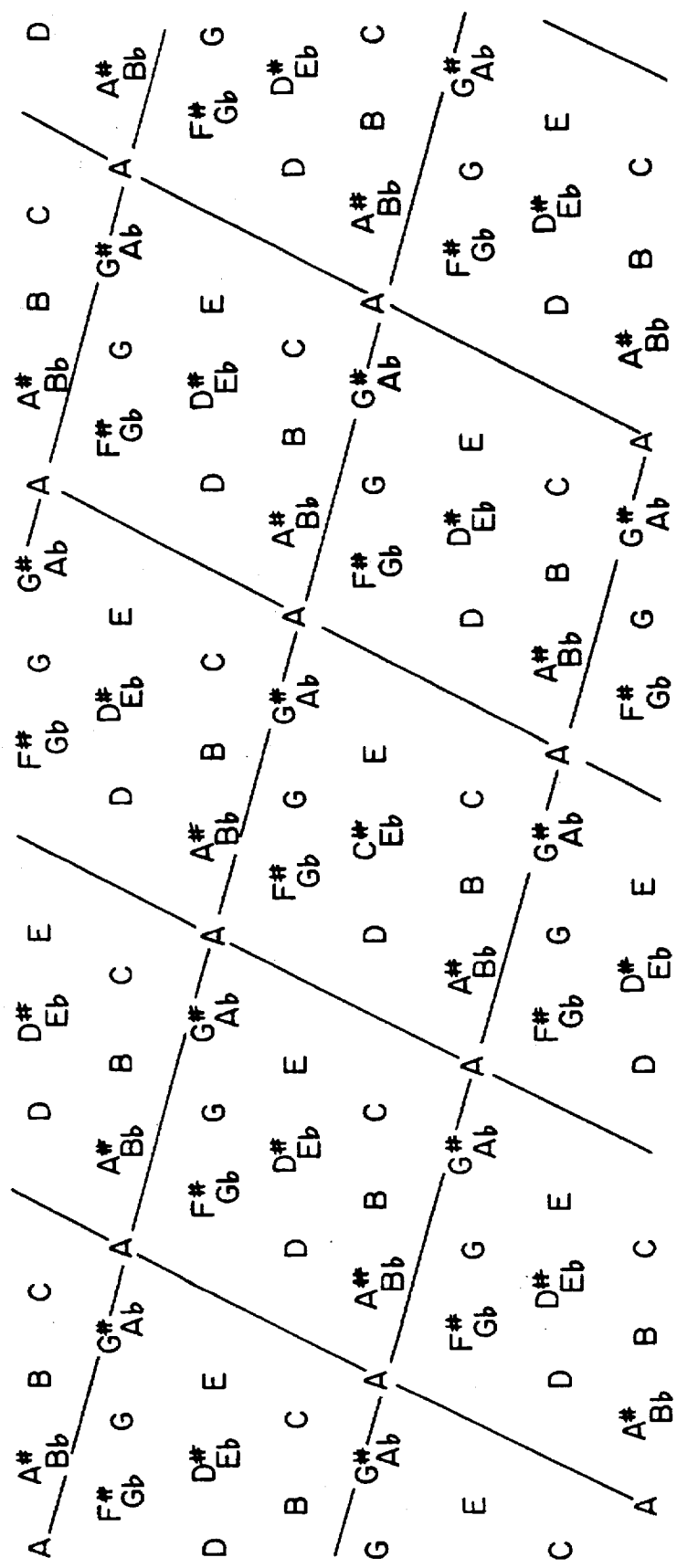

The configurations of FIG. 6 form connected unisons and octaves, which, for any given note, in this example: A, form a grid dividing the array into equal sections, each containing the same notes in the same positions.

In all of FIGS. 1 to 6, the geometrical configurations showing the musical note relationships are shown in particular musical keys as examples only. However, it can be envisaged that such configurations can be repeated at other specific locations within the array to determine a particular relationship in other musical keys. In theory, the number of notes in each row and the number of rows in the array are infinite. However, in practice the shape and dimensions of the array are determined by its particular application.

The array as shown in FIGS. 1 to 6 can be used in many different forms as, for example, an aid to learning the musical note relationships in all musical keys. For example, the array may be incorporated into:

1. Written or printed charts.

2. Pocket sized computers where the pressing of labelled buttons make particular configurations appear with the array being displayed on a computer screen in a fixed or scrolling form.

3. A teaching programme of music theory in disc or cassette form for use with home computers.

4. A programme which enables the keys of a computer keyboard to be used to sound notes arranged by pitch in accordance with the invention.

5. A magic slate with the array printed on it, where the configurations can be drawn over the array to indicate the note relationships and then erased.

6. A musical slide rule, which can be double-sided, where the configurations provided on a transparent material, such as a cursor, move across a background array, to show intervals, scales and chords, etc. within the array. Alternatively, the array is provided on the movable transparent material and the configurations are provided on the background.

7. Musical instruction or demonstration on video tape recordings.

FIGS. 7 to 18 illustrate how the array can be applied to an electronic keyboard (FIGS. 7, 8 and 8a) or a fingerboard of a guitar (FIGS. 9 to 13) or a fingerboard of a bass guitar (FIGS. 14 to 18).

Figure 7A:
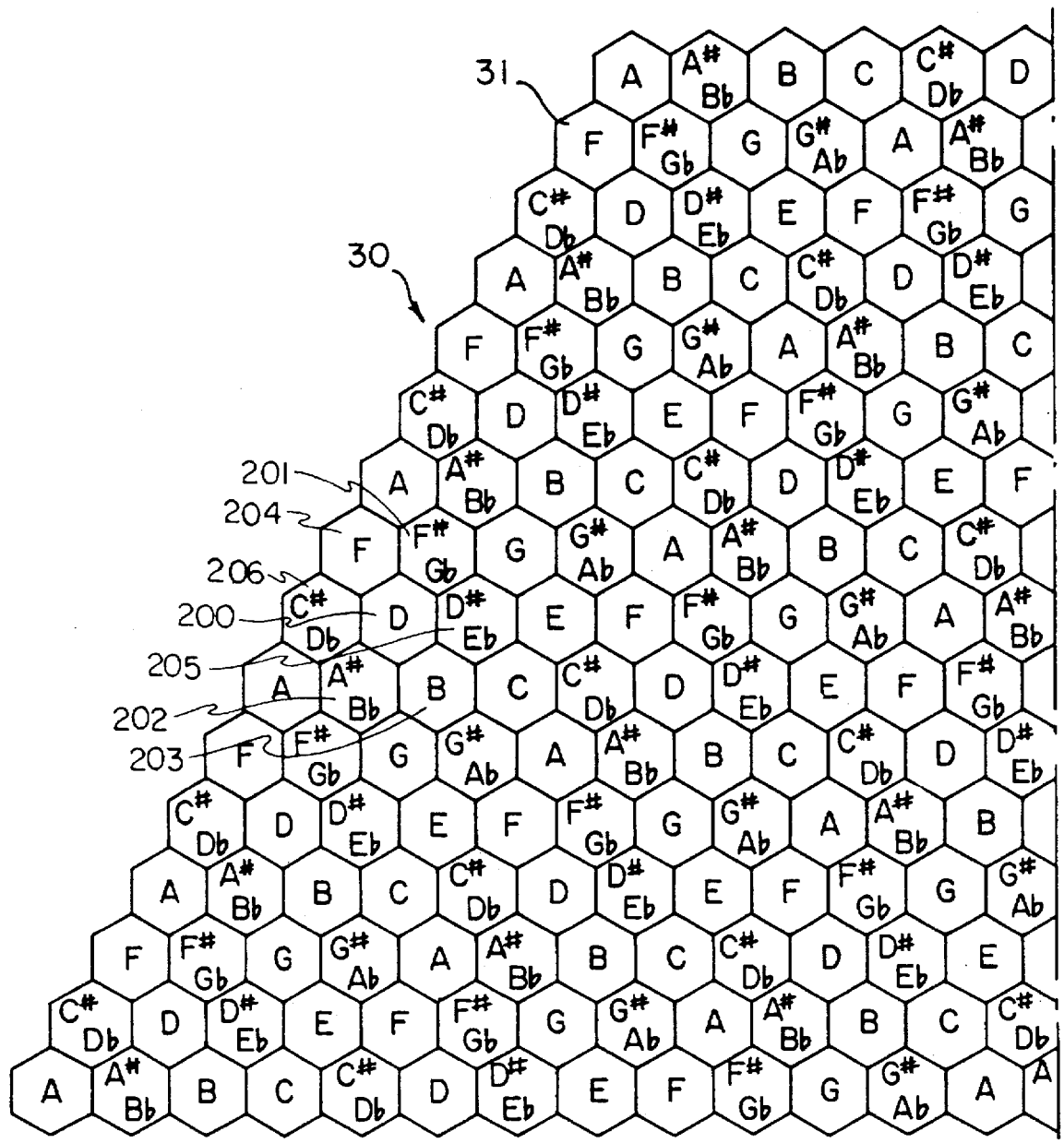
FIGS. 7 and 8 show two embodiments of a keyboard of a musical instrument, to which the array, in FIGS. 1 to 6, has been applied.
Figure 7B:
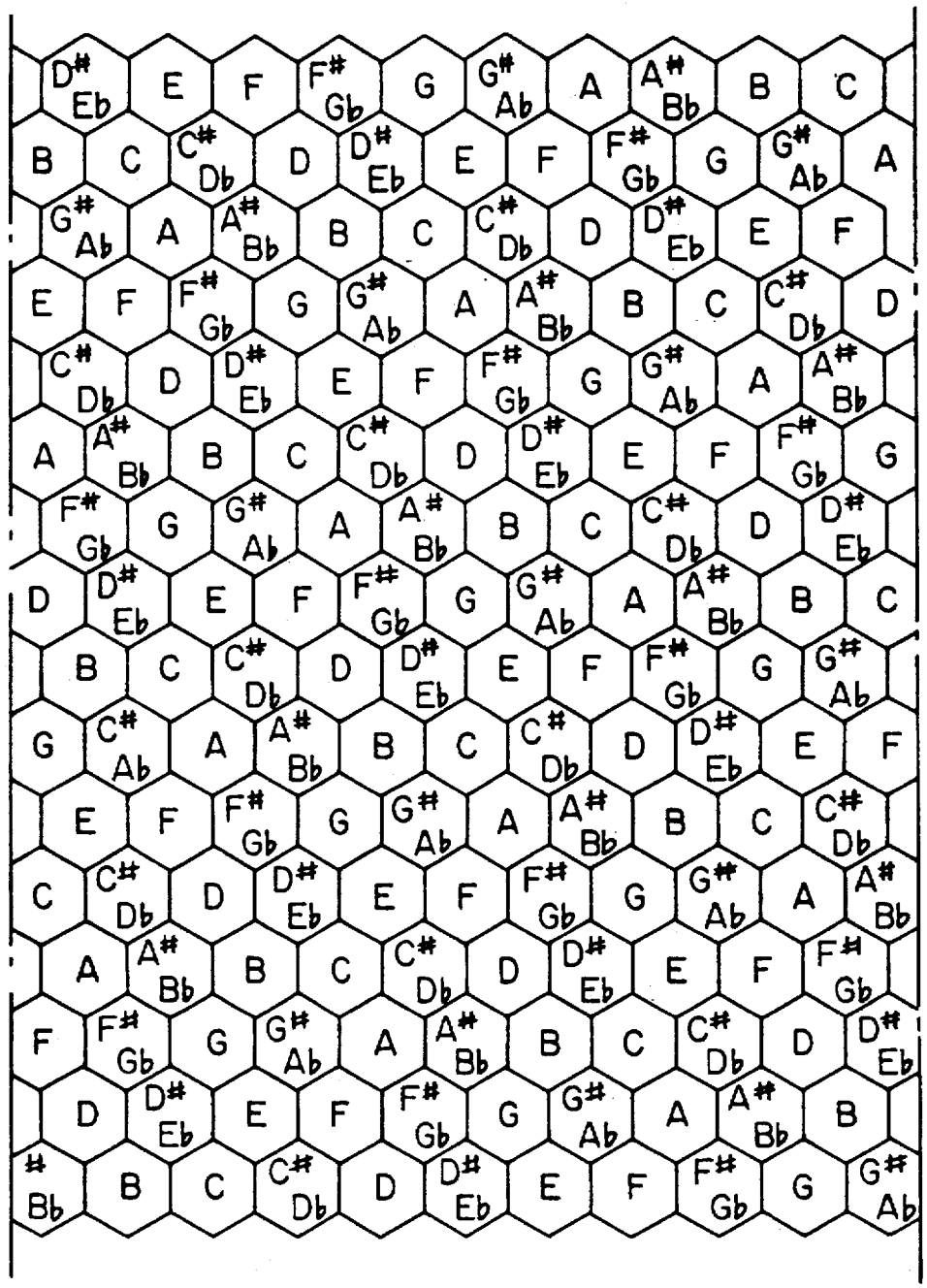
Figure 7C:
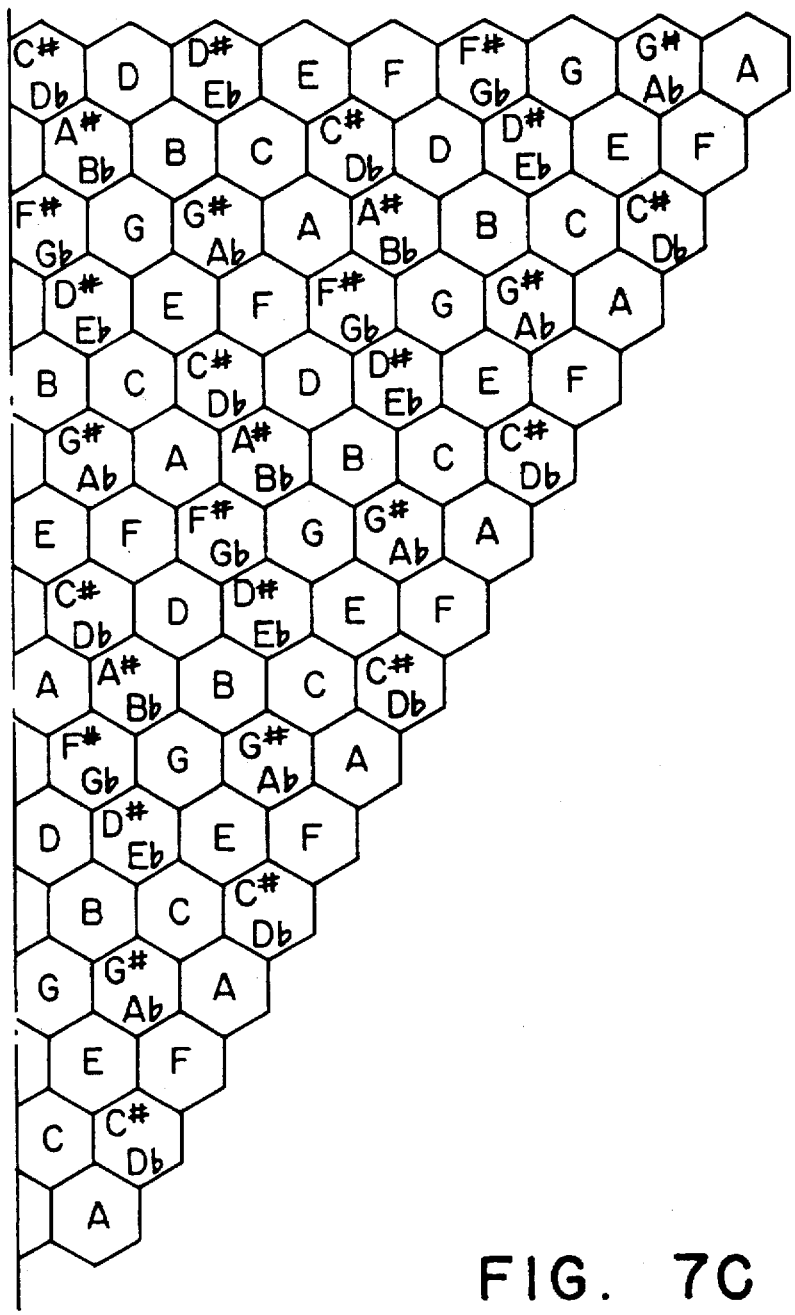

The keyboard shown generally at 30 in FIG. 7 has several horizontal rows of contact positions, in the form of keys, such as at 31, with each key being capable of being used to produce a separate audible note, and the notes being arranged by pitch in a series of semi-tones, in the same arrangement as the symbols of the array shown in FIGS. 1 to 6. The keys are each hexagonal in shape, to produce the staggered arrangement within the array, and form two sets of crossing diagonal rows, one of minor thirds and one of major thirds. This arrangement thus determines all intervals, chords, scales, etc. which each form a particular visual configuration in all musical keys in the same way as shown in FIGS. 1 to 6, which is not possible on a conventional keyboard. Furthermore, because each configuration of the keys on the keyboard is the same for each chord, scale, etc in all musical keys, the arrangement of notes on the keyboard also enables all scales, chords, etc and even melodies, to be played in all twelve keys without altering the fingering pattern for each key, thus enabling the player to modulate through the keys far more easily. Furthermore, the player may play equally well from any position around the instrument.

A seven octave expanded keyboard can have sixteen rows and, by the present invention, can be smaller in overall size than a conventional keyboard instrument. Larger and smaller versions, with differing numbers of keys, can be produced, and the shapes of the keys can be other than hexagonal, for example circular, without altering their alignment with each other. The sound can be reproduced in the same way as on any conventional or other electronic keyboard or synthesizer.

Figure 8:
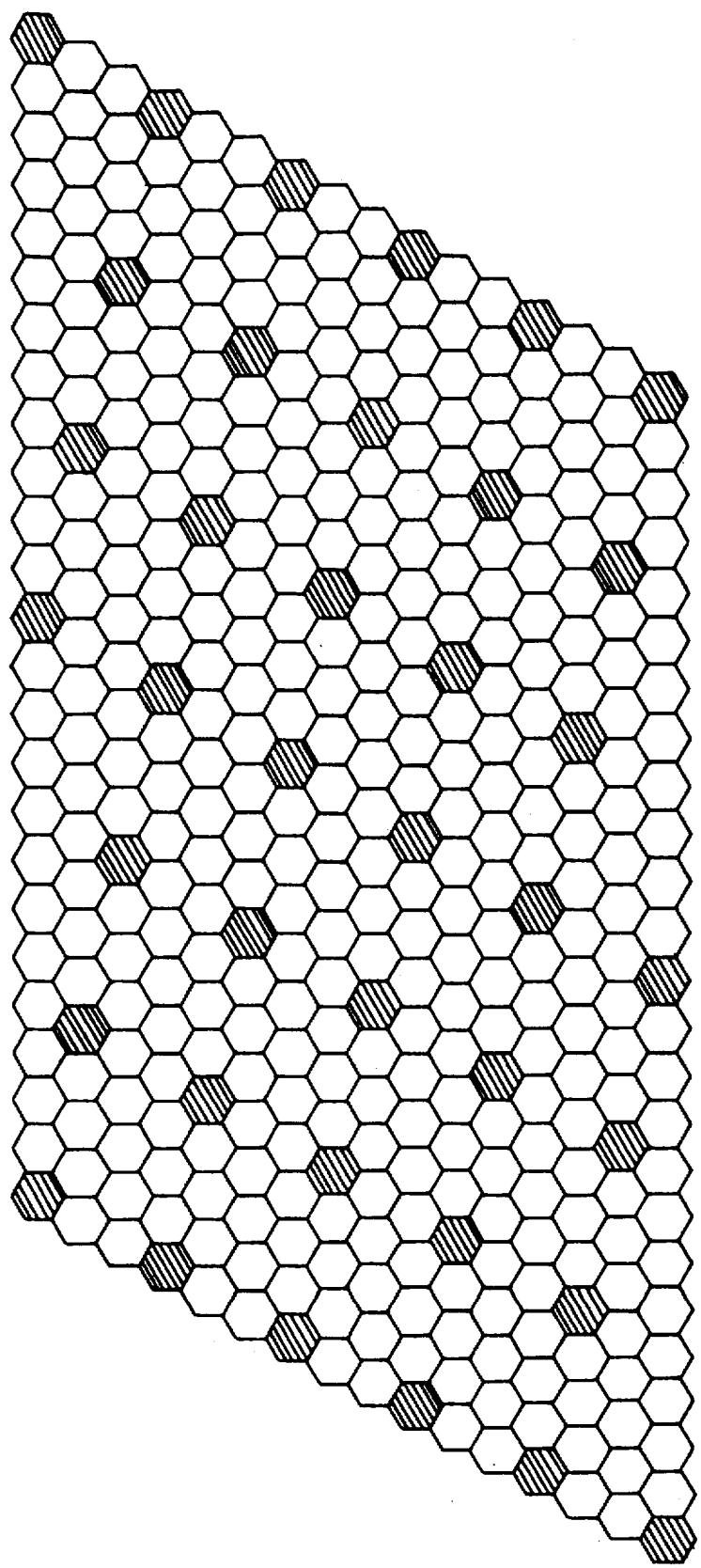
Figure 8A:
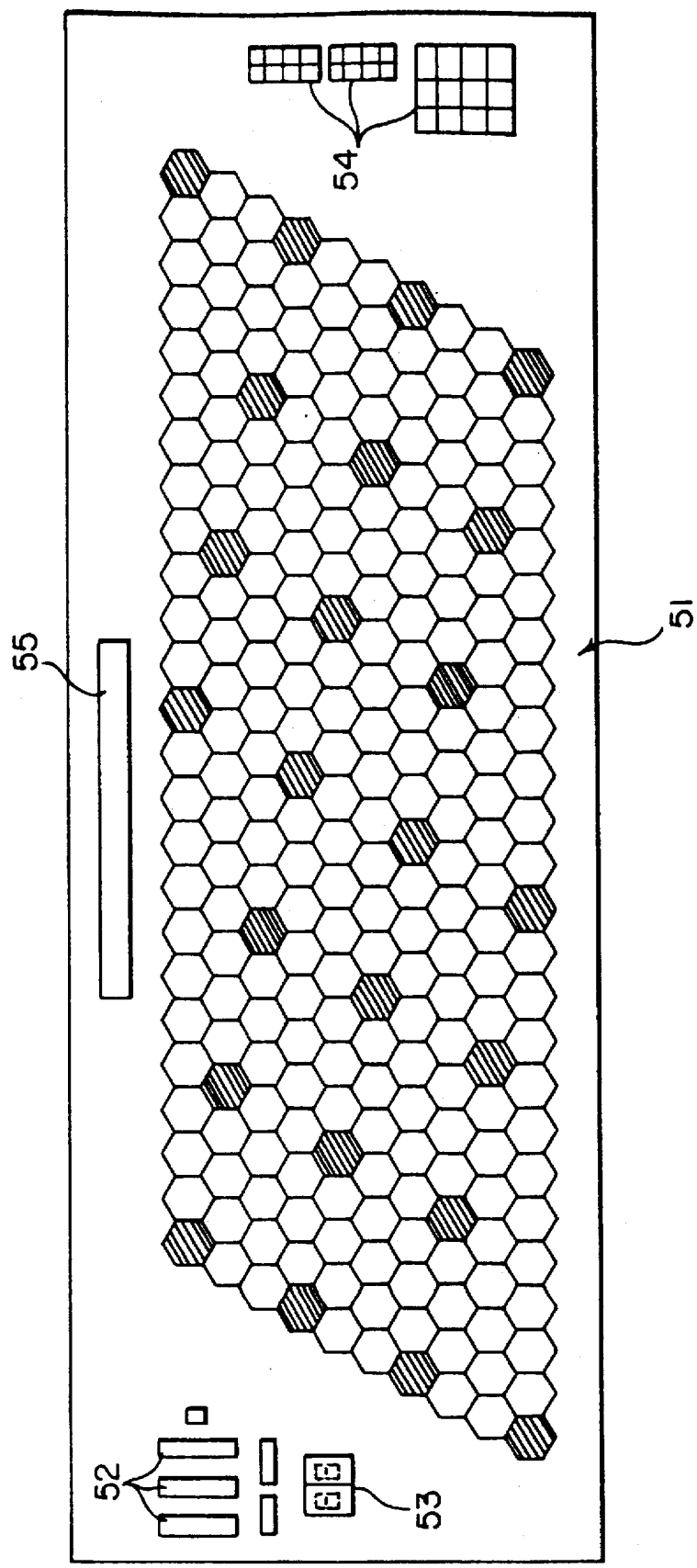
FIG. 8a shows a keyboard instrument incorporating the keyboard shown in FIG. 8, FIGS. 9 to 12 show three embodiments of a fingerboard of a guitar, to which the array, in FIGS. 1 to 6, has been applied.

Rather than labelling each key as shown in FIG. 7 to indicate the positioning of the notes, it may be preferable to show the notes as black or white as on a conventional piano keyboard. One particular example is shown in FIG. 8, wherein the keys of the keyboard have been coloured black or white to show octaves and unisons. Alternatively, all sharps and flats may be coloured black with the remaining keys white, as in conventional piano keyboards. FIG. 8a shows an example of an electronic keyboard instrument including a keyboard 51, in accordance with the keyboard shown in FIG. 8, and a number of control switches or buttons 52, an L.E.D. 53, a number of control key pads 54 and a back-lit L.C.D. 55 arranged around the keyboard 51. The instrument in this example may have a five octave range and can be worn with a shoulder strap or be placed on a stand. A suitable standard interface (not shown) may be used to connect the instrument with other sound modules, etc. There may also be a facility for a built-in system of key matrix connection, whereby each key of the keyboard will have a unique code.

FIGS. 9 to 12 show different embodiments of a fingerboard of a guitar, to which the array, as shown in FIGS. 1 to 6 has been applied. FIG. 9 illustrates the position of the notes and FIGS. 10 to 12 illustrate three examples of different embodiments of the fingerboard.

It can be seen that the fingerboards shown in FIGS. 10 to 12 each have seven strings, which define contact positions and which are set closer together than on a conventional six stringed guitar fingerboard. This number of strings gives the guitar, in accordance with the invention, the same pitch range (approximately four octaves) as a conventional guitar.

because the interval from string to string is shorter. In order to create an arrangement of notes, in accordance with the array (where each note is at the centre of three crossing rows of notes), contact positions at the semi-tone intervals for each string are midway between contact positions on the neighbouring strings. The fingerboard 32 in FIG. 10 has frets 33, which slant at predetermined angles relative to the strings, to provide the contact positions along the strings to obtain the arrangement of the array. Two different embodiments to this are shown in FIGS. 11 and 12. In FIG. 11, fingerboard 34 has a moulded formation 35 shaped to provide the necessary contact positions along the strings to obtain the array. In FIG. 12, fingerboard 36 is provided with studs 37, which provide the contact positions along the strings and each consist of a section of metal rod set into and protruding from holes in the fingerboard and shaped in such a way that the string can be precisely stopped on it, as well as being pushed or pulled sideways onto another protruding stud. A nut 38 is shaped so as to set up the staggered contact positions. The nut is divided to produce one scale length for the first, third, fifth and seventh strings and another scale length, half a fret space shorter, for the second, fourth and sixth strings.

Figure 13:
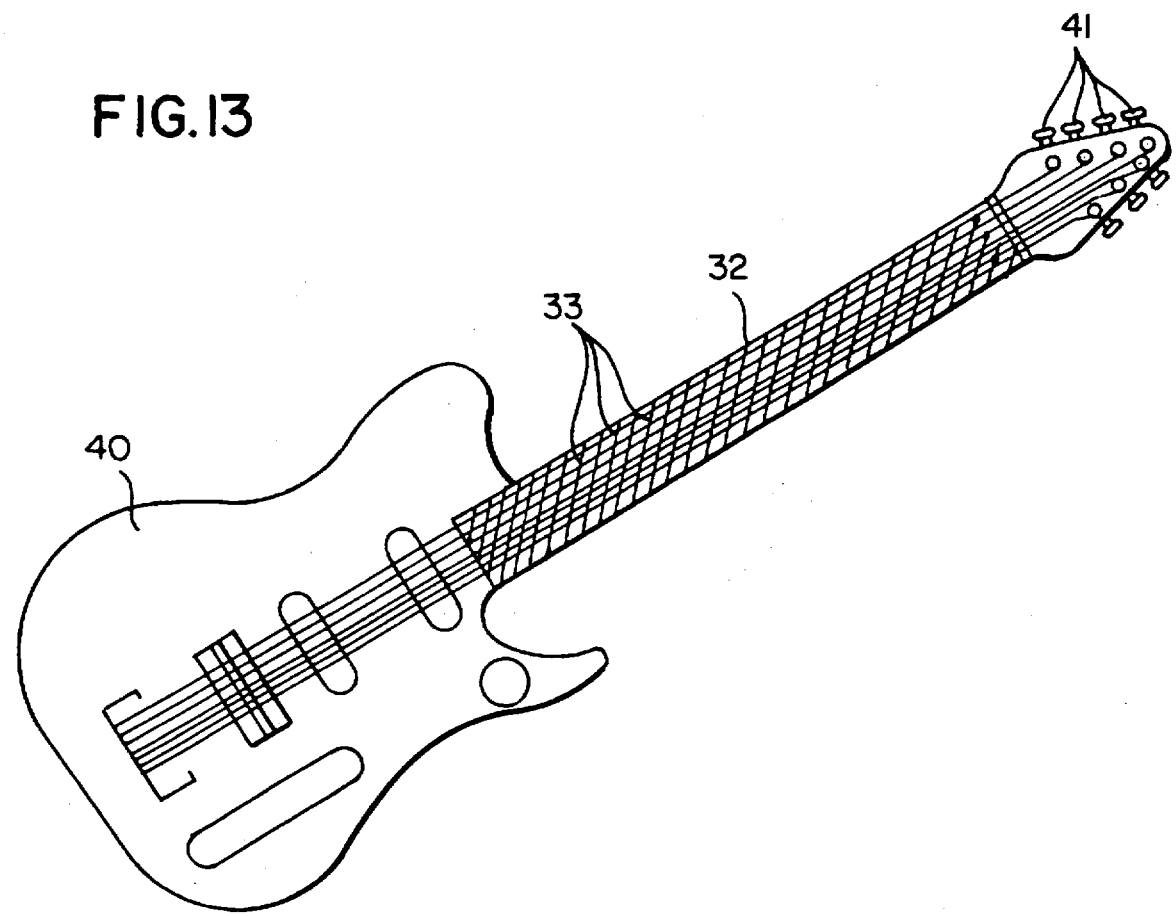
FIG. 13 shows schematically a complete guitar having a fingerboard in accordance with that shown in FIG. 10, FIGS. 14 to 18 show four embodiments of a fingerboard of a bass, to which the array in FIGS. 1 to 6 has been applied.

FIG. 13 shows schematically an electric guitar having a body 40 and a neck with a fingerboard 32. The fingerboard is the same arrangement as that shown in FIG. 10 with slanting frets 33 and seven strings tensioned across the frets. The end of the neck is provided with a headstock carrying tuning pegs 41, for adjusting the tension of the strings. Alternatively, these may be mounted on the body end of the instrument in a way similar to existing 'headless' guitars and basses.

The neck width and scale length of each embodiment of the fingerboard can be similar to conventional guitars thus giving the instruments of the present invention a familiar feel to players of conventional guitars. The staggered arrangement of notes from string to string provides more finger room in spite of the closer spacing of the strings and also enables the player to hold down a major triad with one finger. A slight backward movement of the same finger on the fingerboard will change it to the minor triad. Two fingers laid across the fingerboard can hold down a seven note chord and the playing of any diagonal rows produces diminished and augmented chords. All chords and single note passages can be played with the same finger positions throughout, without the alteration necessary on conventional guitars when allowing for the (differently tuned) third string.

Figures 14A, 14B:
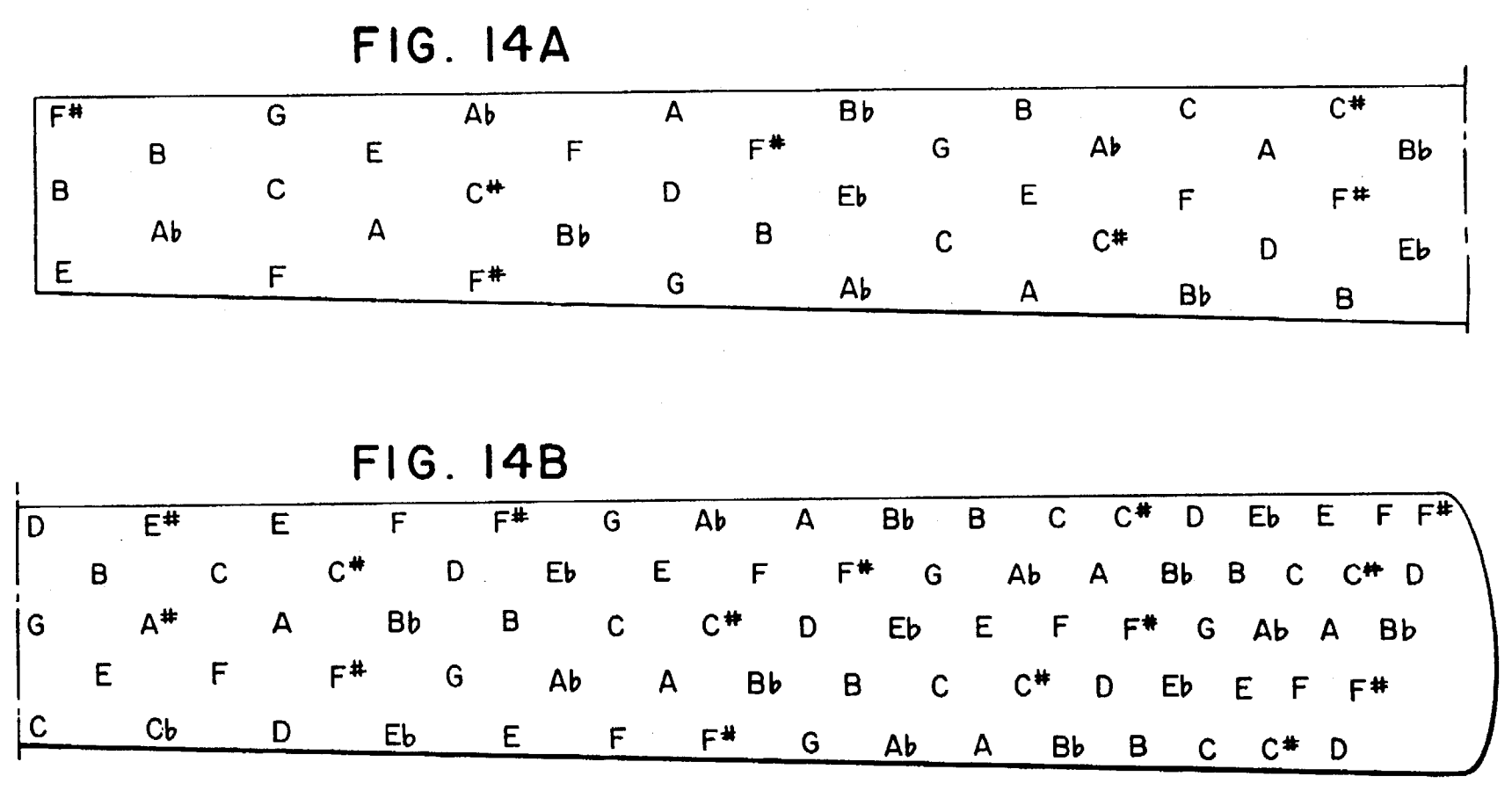
Figure 15:
Figure 16:
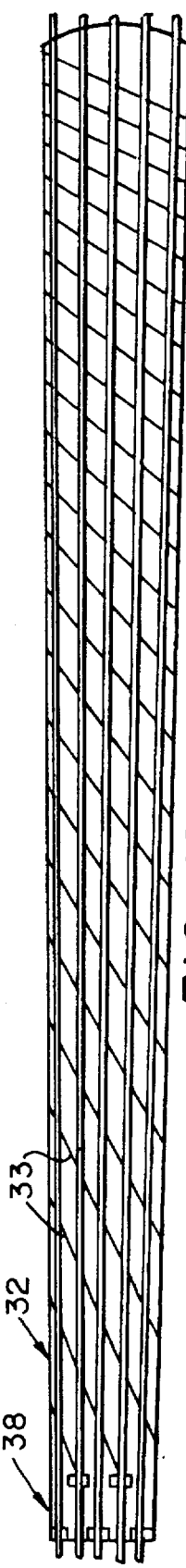
Figure 17:
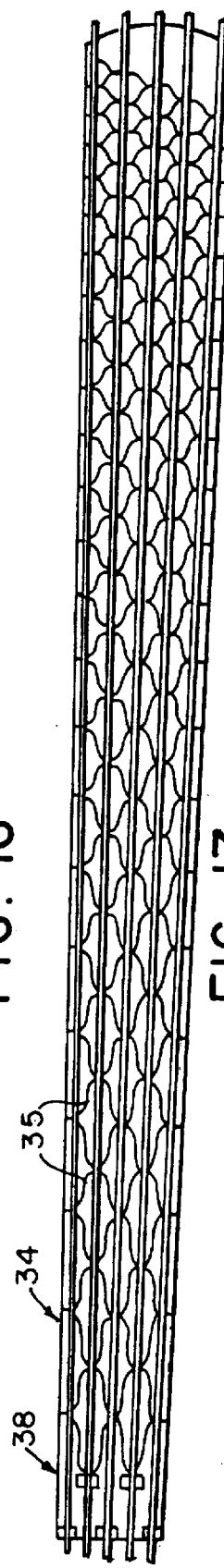

As shown in FIGS. 14 to 16, the array may be applied in a similar manner to the fingerboard of a bass, rather than a guitar. In these embodiments, the fingerboards have only five strings and, in addition, as shown in FIG. 15, a fretless bass fingerboard 39 may be used.

According to another embodiment of the present invention, there is provided a device comprising two overlapping members slidably movable relative to each other one of the members having an array of symbols each representing a musical note and being arranged in accordance with the present invention, and the other member being arranged to indicate on the array each musical note relationship in different musical keys as the members are slidably moved relative to each other.

Figure 18:
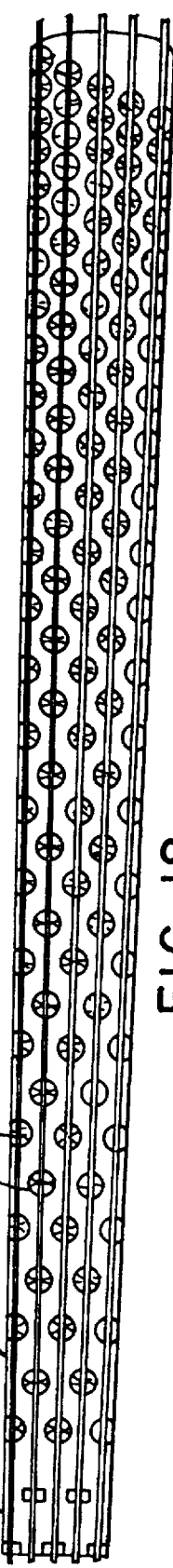
FIGS. 18a to 18c show parts of a device, in accordance with the invention, in the form of a slide rule.
Figure 18A:
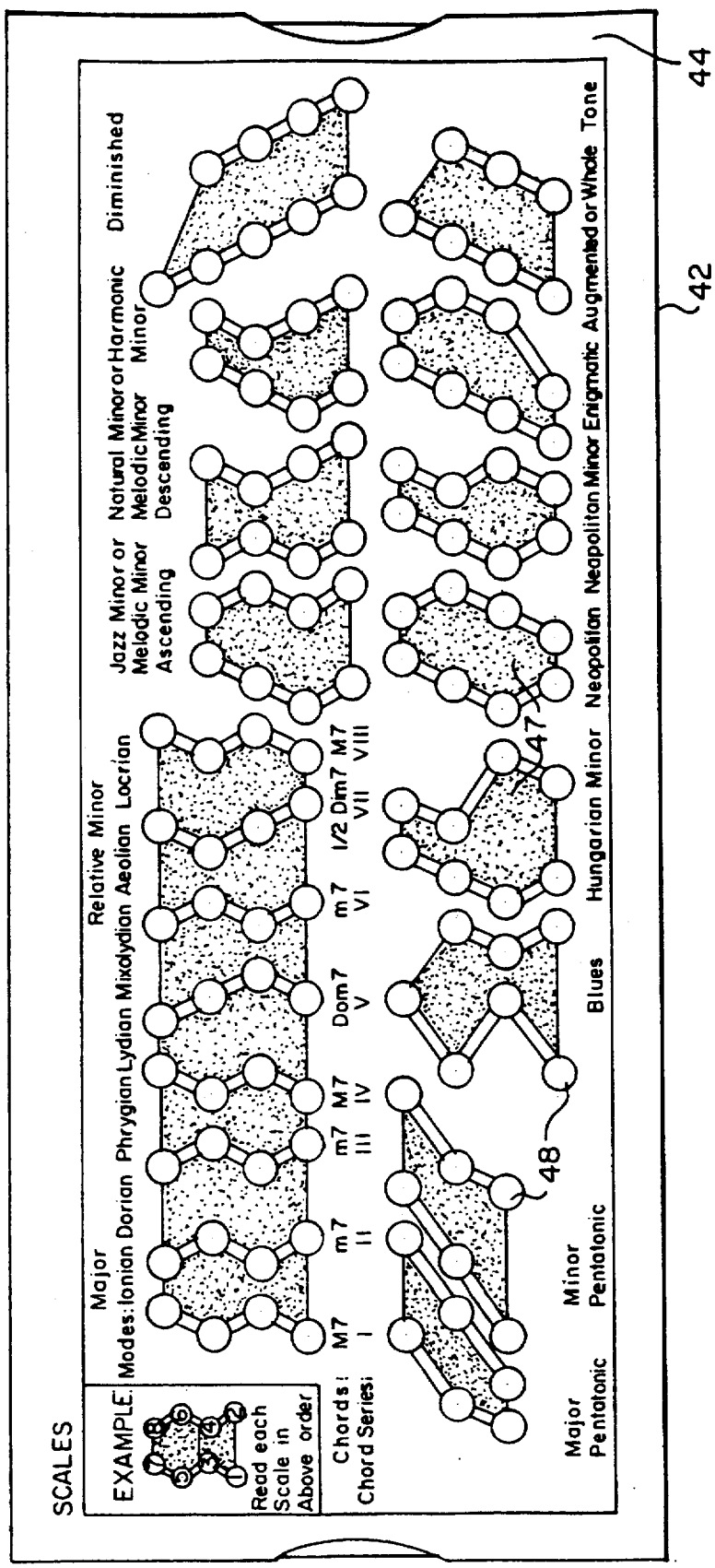
Figure 18B:
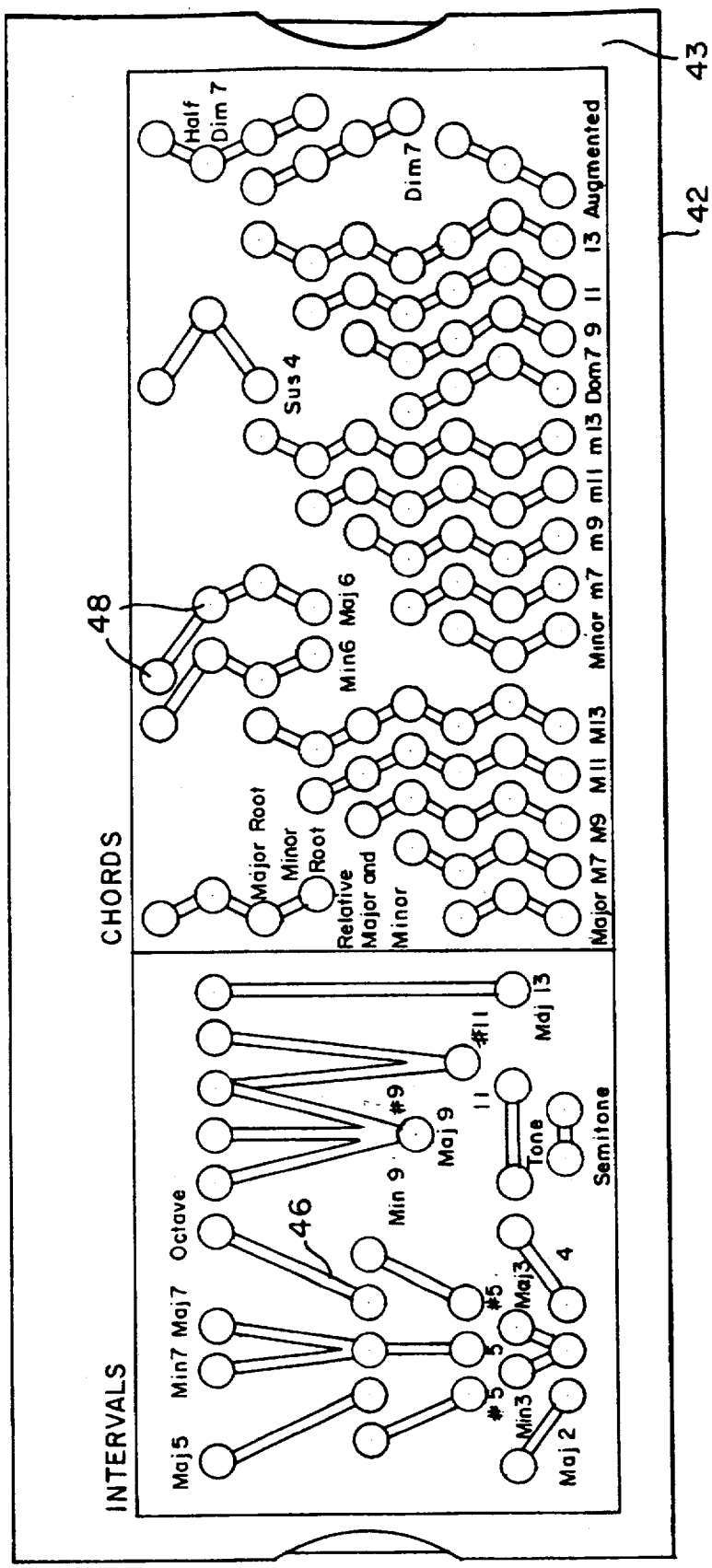
Figure 18C:
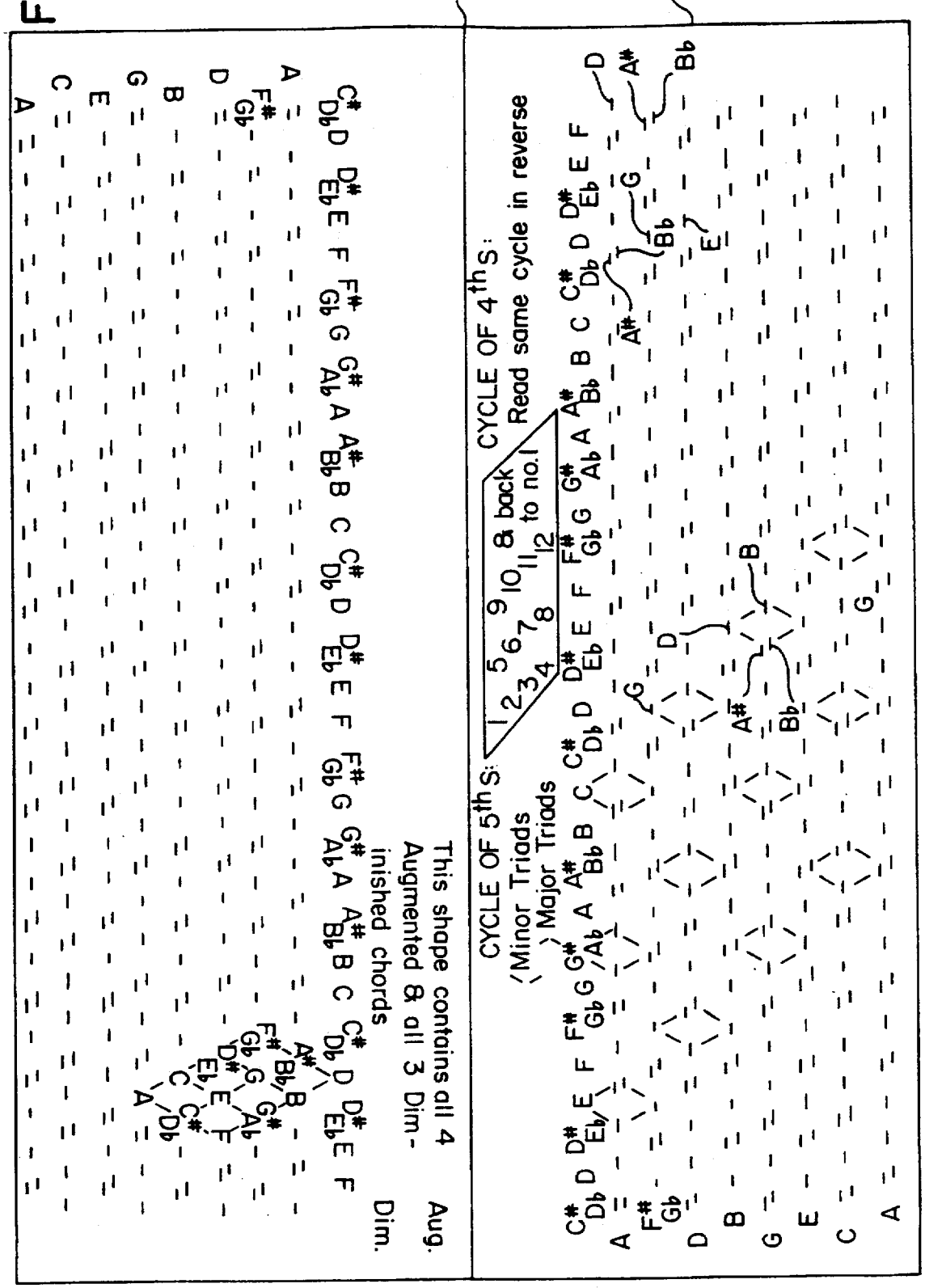

Referring now to FIGS. 18a to 18c, there is shown a slide rule device including an outer sleeve 42, which acts as a cursor, having two opposite sides 43,44, within which the inner member 45 can be slid. The slide rule provides a reference to the musical note content, in any key, of intervals, of varying types of chords, and of scales, including the modes of the major scale. The outer sleeve 42 carries connecting bands, such as at 46 to indicate intervals and chords, and block shapes such as 47 to indicate scales and modes. The inner member 45 is folded along line 48 before insertion into the sleeve 42 and each side of the folded inner member 45 carries the array of musical notes as shown in FIGS. 1 to 6. Also marked on this member are connecting bands to indicate a useful chord progression, the "cycle of fifths" and a shape indicating augmented and diminished chords. These markings are visible only when the inner member is removed from the outer sleeve. The outer sleeve 42 is formed on each side with holes or transparent windows, such as those shown at 48, through which the notes of the array on the inner member 45 are visible, as shown in FIGS. 18a and 18b. The notes visible through the holes or windows are thus changed as the inner member 45 is slid within the sleeve 42.

Figure 19:
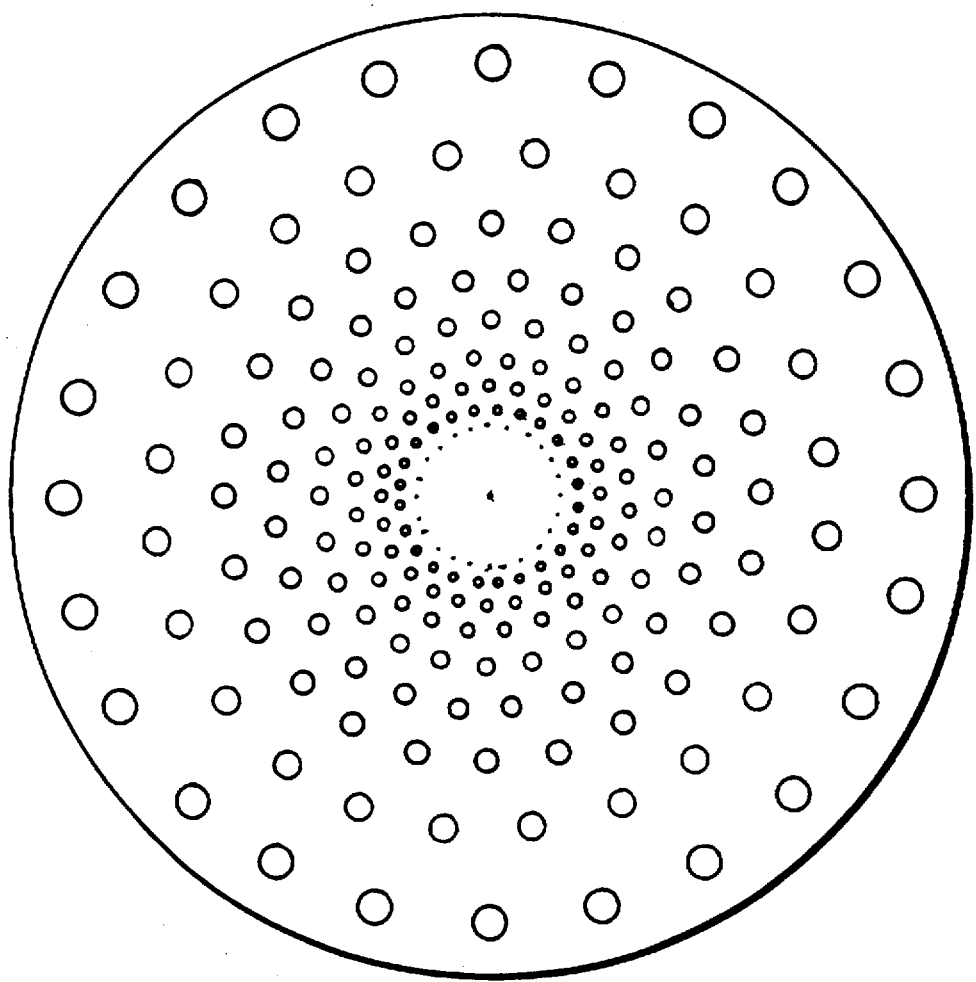
FIG. 19 shows schematically another example of a device as shown in FIGS. 18a to 18c, FIGS. 20 to 23 show schematically four further examples of keyboards incorporating the present invention.

The slide rule can also be made in a disc form, with the array of notes in a pattern such as is shown schematically in FIG. 19, wherein each row of semitones follows a circular path.

Other possible forms for slide rules based on the same array include three dimensional ones such as prismatic, cylindrical and conical.

Figure 20:
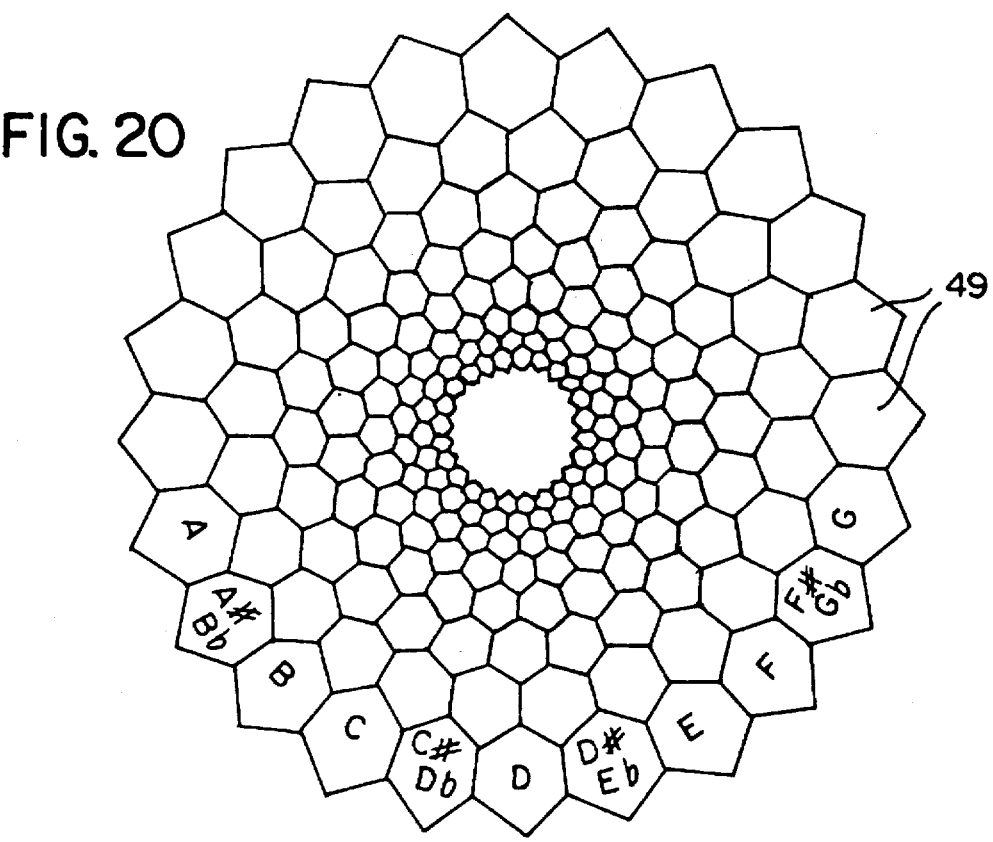
Figure 21:
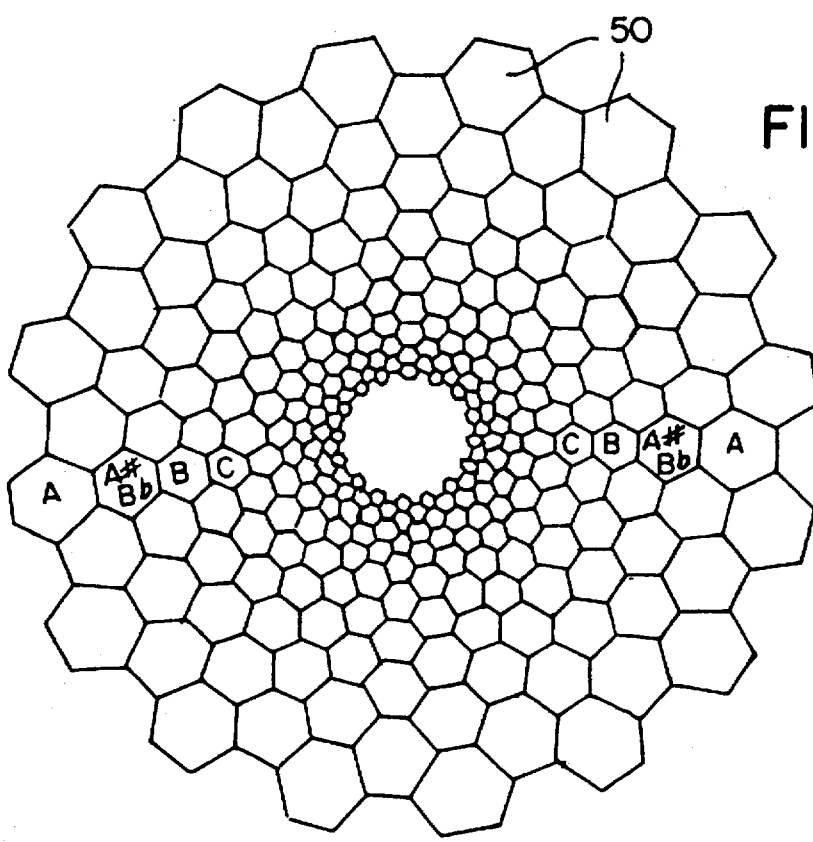

Whilst particular embodiments of the present invention have been described, various modifications may also be envisaged without departure from the scope of the invention. For example, the array may be formed by vertical, rather than horizontal, lines. The lines of semitones may be curved instead of straight, and can even form concentric circles or semicircles. FIG. 20 shows a circular keyboard with concentric circles of hexagonal keys 49. The relationship between musical notes from one circle to the next is the same as that described for the keyboard with straight rows of semitones. Any degree of curvature is 35 possible, from none at all to slight or extreme. FIG. 21 shows another circular keyboard with the rows of hexagonal keys 50 arranged in straight lines forming the radii of a circle. The fingering of such an instrument would be reversed from the left hand to the right hand, and if the hands were then crossed, the music itself would be harmonically reversed, e.g. a low note to a high note would become high to low. It may also be applied to many other musical instruments, such as the Chapman stick, lute, mandolin, banjo, accordion, violin and viola, as well as synthesizers and controllers of sound-generating modules, of any shape or size, which may have keys of any shape or size and may be floor standing or supported by a strap worn by the player like a guitar. Any form of the array may also be incorporated into an existing instrument or offered in combination with a conventional instrument. Also kits and accessories may be provided to adapt conventional musical instruments to those, in accordance with the present invention.

Figure 22:
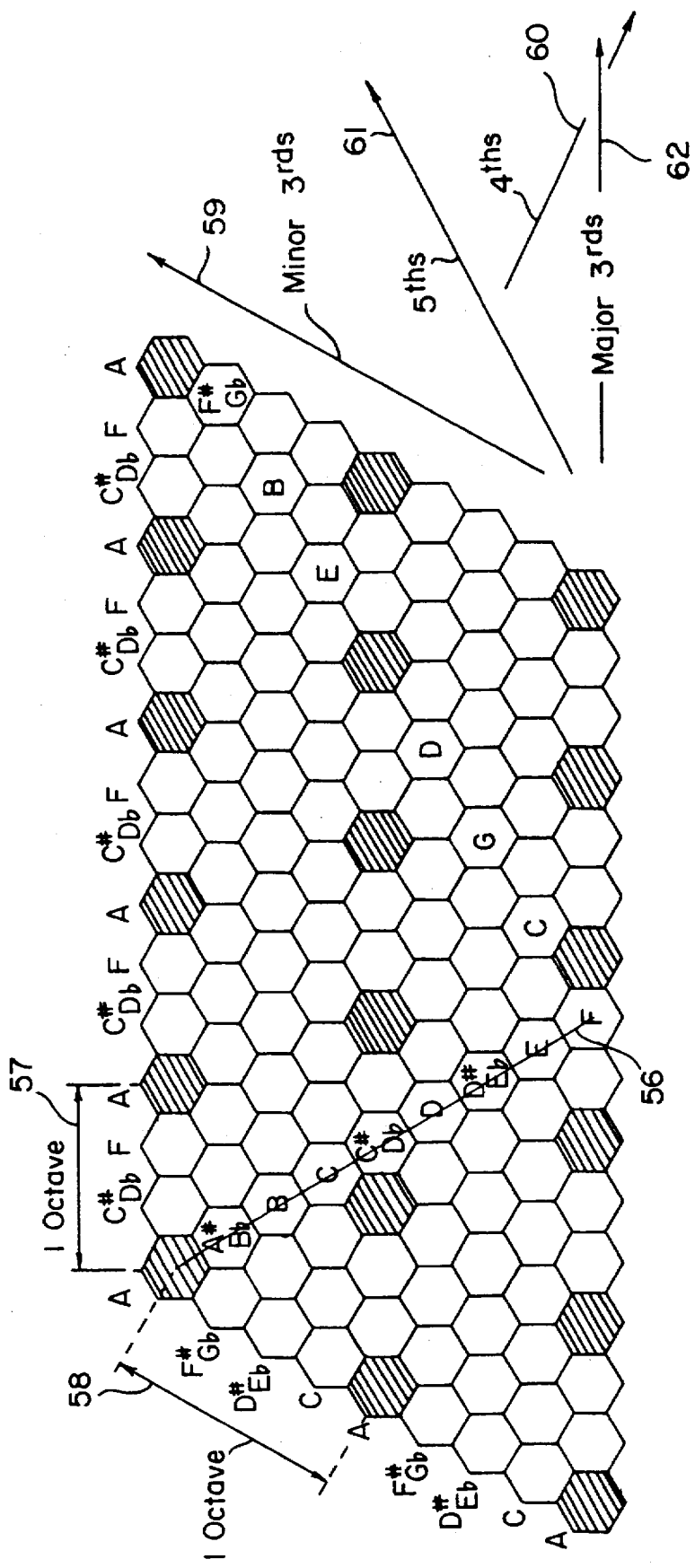
Figure 23:
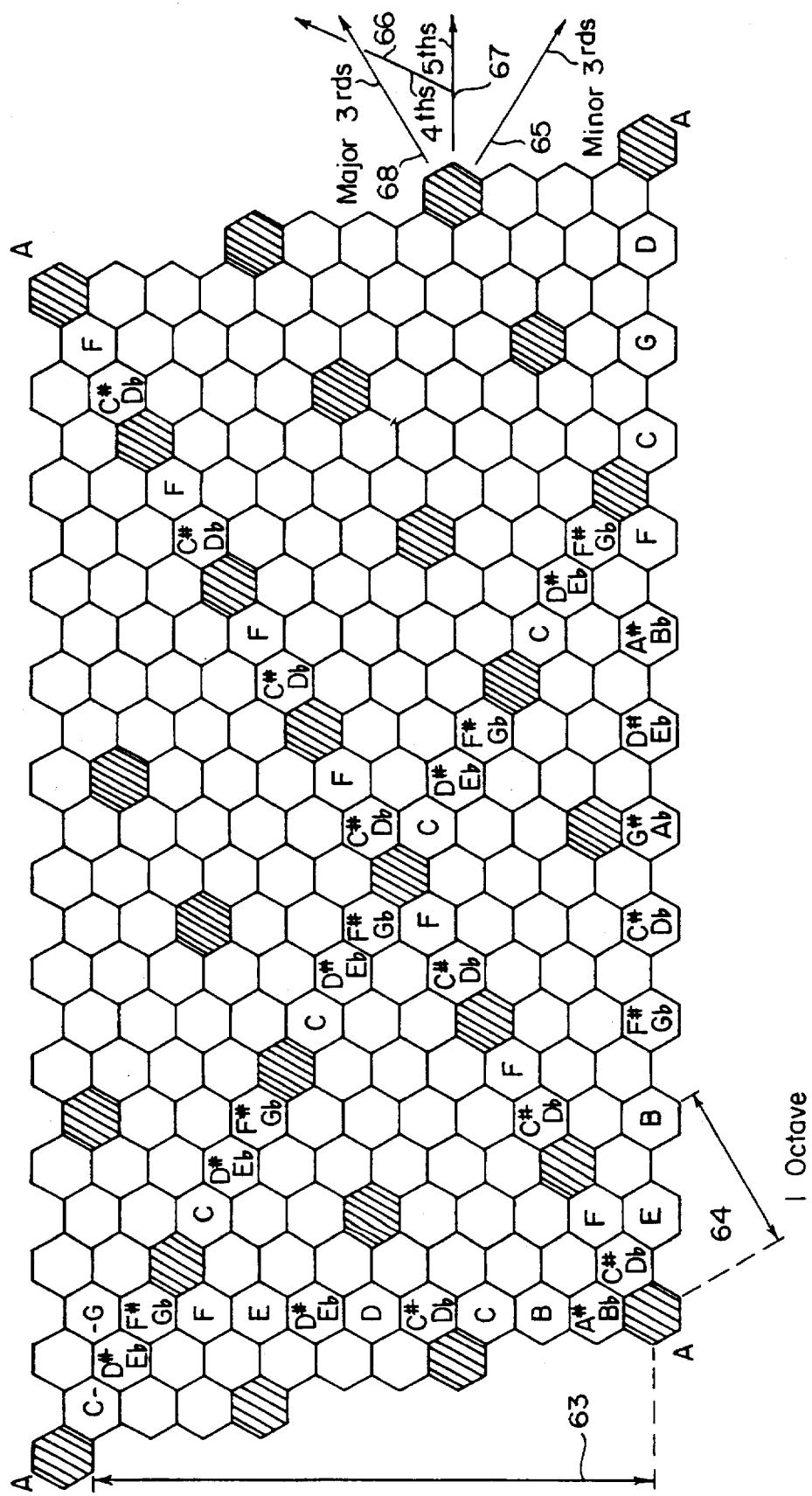

FIG. 22 shows another example comprising a seven octave keyboard wherein all the "A" keys are shaded and with the lines of semi-tones, such as the one shown at 56, being rotated 60° anti-clockwise with respect to the horizontal lines shown for example in FIG. 8. This arrangement thus produces octaves, such as at 57 and 58, minor 3rds as at 59, 4ths as at 60, 5ths as at 61, and major 3rds as at 62. FIG. 23 shows yet another example of a seven octave keyboard, again with all "A" keys shaded, but with the lines of semi-tones, such as the one shown at 63, rotated 90° anti-clockwise and turned upside down so that the semitones increase in pitch from the bottom of the keyboard upwards. This then produces octaves, such as at 64, minor 3rds as at 65, 4ths as at 66, 5ths as at 67, and major 3rds as at 68.

Furthermore, the symbols arranged to produce the array may take the form of any visual representation, which can be used to represent different musical notes. For example, the symbols may consist of different colours, letters, numbers or any other design.

Figure 24:
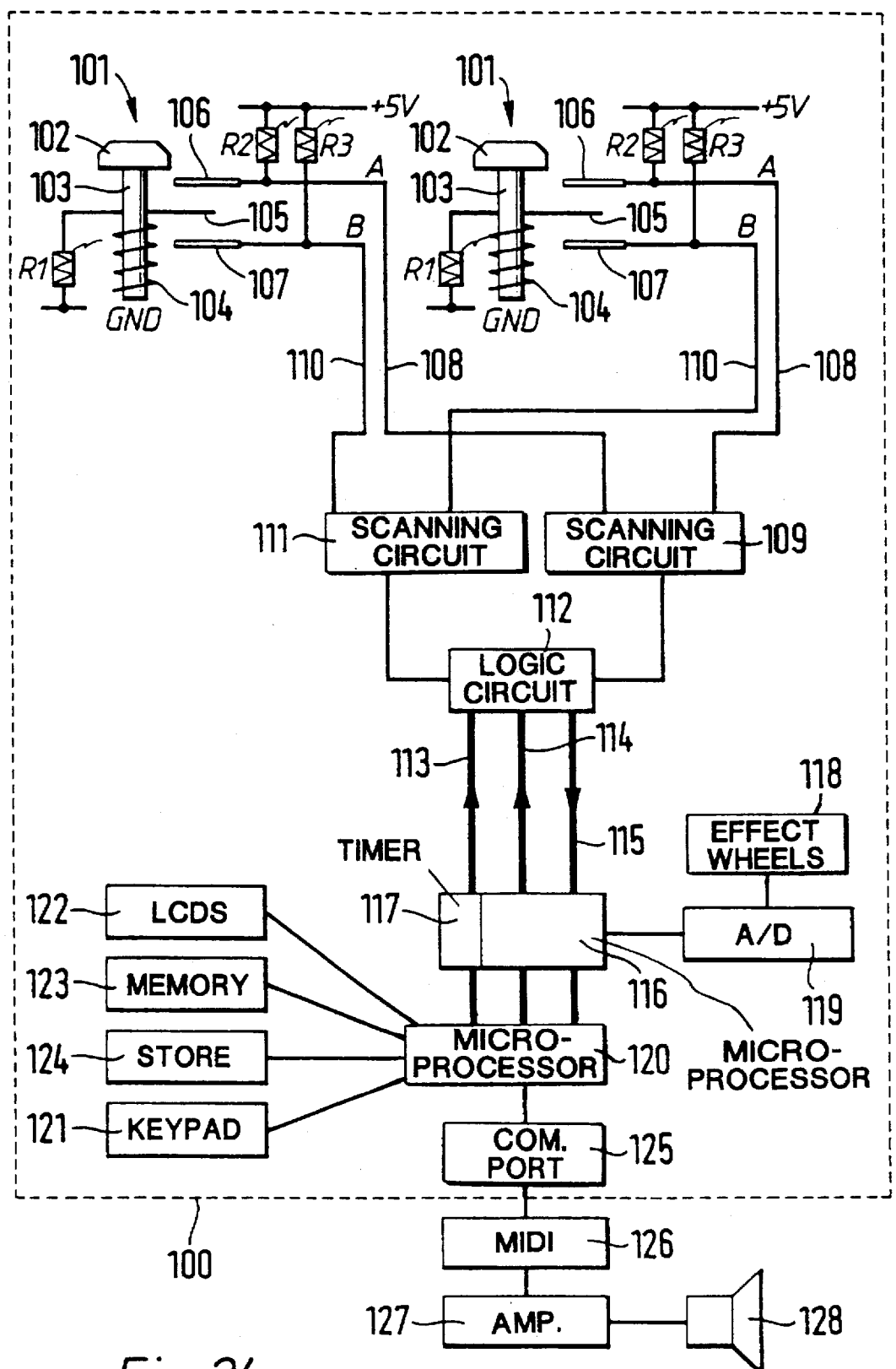
FIG. 24 shows a schematic lay-out of an embodiment of a keyboard device in accordance with the invention.

It will be appreciated that the keys comprising a keyboard according to this invention are connected to suitable tone generation means. By way of example, a suitable tone generation means may be incorporated into a keyboard device 100, as illustrated in FIG. 24. The device may comprise any of the key-board constructions described herein comprising, for example, up to 369 keys each representing a musical note. However, the schematic lay-out illustrated in FIG. 24 has been greatly simplified to show the arrangement for only two of the keys.

In FIG. 24, the keyboard device 100 comprises a keyboard consisting of a plurality of keys 101. Each key 101 may comprise a key cap 102 attached to a stem 103 resiliently mounted by a spring 104. Each key 101 has three electrical contacts 105,106,107, with contact 105 being movable with the movement of the key 101 and electrically connected to Ground via resistor R1. Contacts 106, 107 are electrically connected to a +5V power rail via resistors R2 and R3, respectively, and are referred to hereinafter as "sense A" and "sense B". Logic lines 108, from each key, connect sense A to a sense A scanning circuit 109 and logic lines 110, also from each key, connect sense B to a sense B scanning circuit 111. Although only two such lines are shown connected into each scanning circuit, it will be appreciated that the actual number of lines will depend on the actual number of keys of the keyboard. The scanning circuits 109, 111 are connected to a select logic circuit 112 which is connected via three busses 113,114,115 to a first microprocessor 116 and associated timer 117, the busses comprising address bus 113, data bus 114 and control bus 115. The keyboard device also preferably includes effect wheels 118 for adjusting, for example, pitch bend and modulation of the musical notes played, and are connected into the first microprocessor 116 via an analogue-to-digital converter 119. The first microprocessor 116 and timer 117 are connected to a second microprocessor 120 which interacts with a user data selection keypad 121 and a user LCD interface 122, as well as a memory 123 and a mass storage facility 124. The second microprocessor 120 is also connected to output communication ports 125. The keyboard device can be connected via outlet ports 125 to any suitable sound generating system, such as a MIDI sound source 126, an amplifier 127 and a speaker 128.

Operation of the keyboard device 100 will now be described with reference to FIG. 24, as well as FIGS. 25 and 26 which shown algorithm flow charts of the scanning procedure of each key and of the whole keyboard, respectively.

The scanning logic requires its inputs be presented with logic level electric signals (usually +5V for ON or HIGH and 0V for OFF or LOW). The key shaft 103 is provided with contact 105 that is held permanently LOW, whilst the other two contacts 106,107 (i.e. sense A and sense B) are held HIGH. When the key 101 is at rest, sense A is normally held LOW by virtue of the contact between contact 105 and sense A and this output is fed into the select logic circuit 112 indicating to the microprocessor 116 that it is LOW. Sense B is currently HIGH at this stage since it is connected to the +5V supply and this output is fed into the select logic circuit 112 indicating to the microprocessor 116 that it is HIGH.

When the key 101 is depressed and begins to move, the electrical contact between contacts 105 and 106 is broken and sense A will go HIGH by virtue of being connected to the +5V supply. Sense B will remain HIGH until the point in the travel of the key 101 where the contact 105 connects with contact 107 thereby driving sense B LOW. A sensing logic circuit operating sufficiently fast enough will be able to detect the making and breaking of contacts within microseconds of occurrence.

When the key 101 is released and begins its return travel to the rest position, the reverse of the above procedure occurs. Sense B will be driven HIGH and sense A will be remain HIGH until being driven LOW when the contact 105 makes contact with contact 106.

The select logic circuit 112 informs the first microprocessor 116 of each make-break operation on both sense A and sense B contacts. By timing the transition from the break of sense A and make of sense B (i.e. the time between sense A going HIGH to the time when sense B goes LOW), then the speed at which the key 101 is depressed may be determined. To enable this function, the sense A HIGH transition would cause the first microprocessor software to start the timer 117 associated with the first microprocessor 116 and the sense B LOW transition would cause the timer 117 to stop. Values read from the timer's control registers would indicate the transition time, after some appropriate calculations have been applied. This timer information may be used in software in any number of ways—one of which is to determine MIDI key Velocity, as described hereinafter. The select logic circuit 112 is under the direct control of the first microprocessor 116 and does not contain any intrinsic logic about how the keys 101 are scanned. Instead the circuit 112 receives command codes to implement the scanning, the codes being sent by the microprocessor 116 via busses 113 and 114 to simplify the implementation of the key scanning logic and, to keep sense A and sense B signal processing apart two separate scanning circuits, sense A scanning circuit 109 and sense B scanning circuit 111, are provided. These circuits are under the control of the Select Logic circuit 112, which interfaces directly with the first microprocessor 116 from which it receives the key selection codes.

The first microprocessor 116 should be capable of scanning a maximum of, for example, 369 keys at such speeds that the keyboard does not feel slow and unresponsive to the user. By using a microprocessor dedicated to task, sufficient speeds are capable. The microprocessor 116 activates the circuits 109, 111 and 112 to carry out the scanning procedure shown in FIG. 25 for each key 101 in succession. The software of the microprocessor will provide the select codes for key scanning, the processing of key level contact (sense A and B) transitions, the timing of these transitions, and the production of appropriate codes to the second microprocessor 120 to inform it as to which note(s) are to be output to the MIDI network 126. Each key 101 on the keyboard has a unique pre-defined selection code. When the microprocessor 116 presents a code to the Select Logic circuit 112, the current state of the sense A and B outputs from the key being scanned is sent to the microprocessor 116. The codes are presented on the processor data and address buses 113,114 to the Select Logic circuit 112, and the output sense A and B levels are input to the microprocessor 116 on the control bus 115. The microprocessor registers these sense A and B levels and performs some specific operation dependant on their levels (HIGH or LOW). When sense A goes HIGH, the microprocessor 116 knows that the key 101 has been depressed. When it senses that sense B has gone LOW, then the key 101 has reached the end of travel and is said to be fully depressed. The return of the key 101 will result in sense B going HIGH, and then sense A returning LOW when the key has returned to its rest position.

These transitions could be determined one key at a time, but this would be very wasteful of processor speed and power. As a result a technique to multiplex the key scanning operation is used by applying the Select Logic codes of consecutive keys and retaining their status (HIGH or LOW). By matching the current status with previous status it is possible to determine the movement of many keys simultaneously. This is achieved as follows.

The Select Logic code is supplied for the first key. If the sense A and sense B lines for this key are HIGH then the key is in motion, that is, it has been depressed. On the other hand, if sense A is LOW and sense B is HIGH, the key is at rest. The software of the microprocessor 116 5 retains the fact that the key has been depressed, starts the counter of the timer 117 and then presents the Select Logic code of the next key. The status of this key is then determined and retained. This then continues for all the keys on the keyboard, eventually returning to scan the first key. The Select Logic code of the first key is once more presented by the microprocessor, and the current status of the key read. If the first key's sense A and B are both still HIGH then the key is still in motion. However if sense B is now LOW and sense A is HIGH, then the key is fully depressed and has reached the limit of its downward travel. The microprocessor then terminates the timer counter for the first key. These operations then continue with the next key, and so on.

Figure 25:
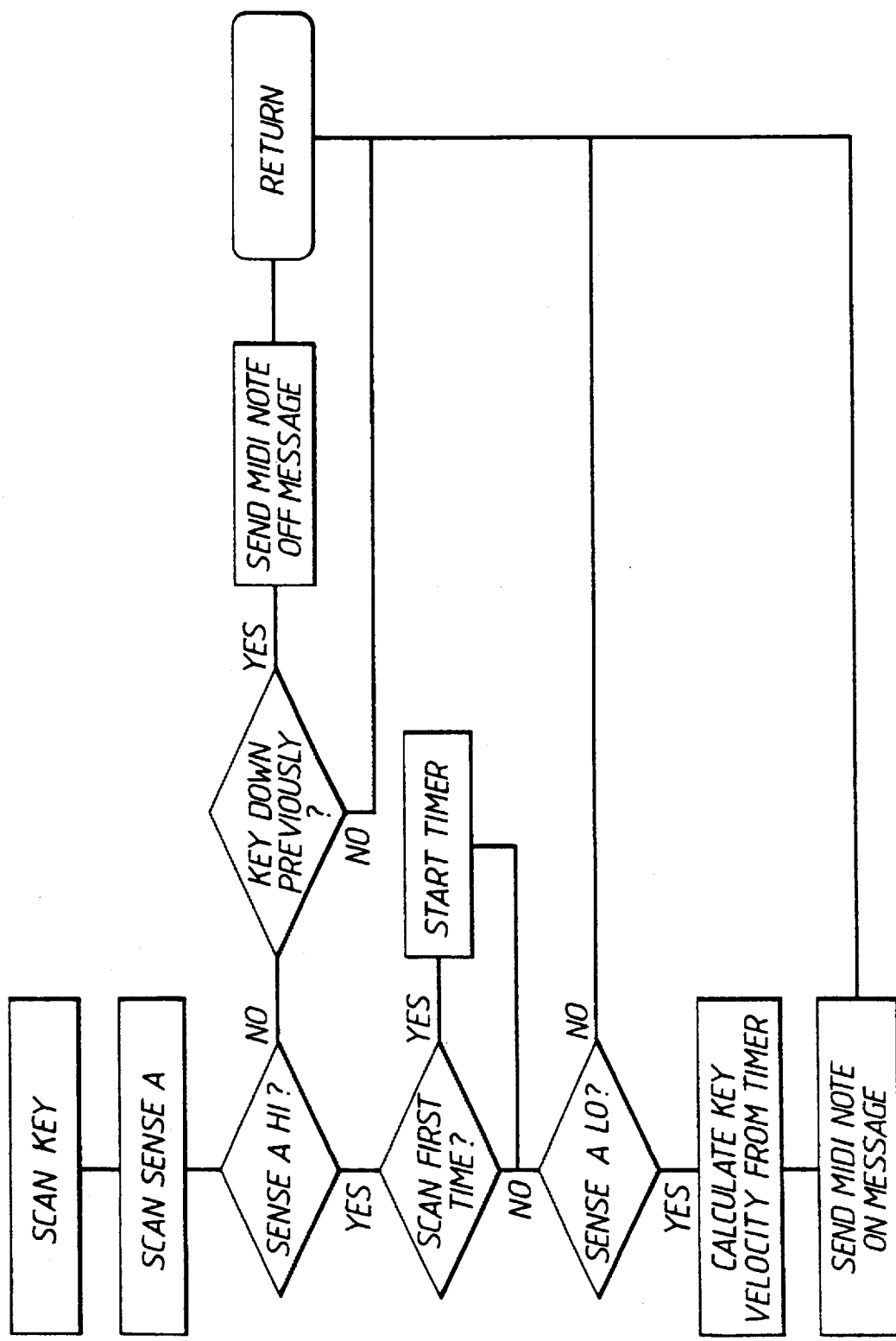
FIGS. 25 and 26 show algorithm flow charts of the operating procedure of the device shown in FIG. 24, and FIGS. 27 to 35 show schematically further embodiments of keyboards suitable for use in the present invention.

FIG. 25 is a logic flow chart of the stages for scanning a single key—the stages required for multiplexing the keys are not shown since this would complicate the diagram. "Scan Key" is the stage at which the Select Logic code is presented by the microprocessor 116. The sense A input to the microprocessor is then read. If sense A is HIGH then the key is regarded as being depressed. If sense A is LOW, then a match with internal status records of the microprocessor 116 will indicate whether the key has returned to the rest position after being depressed, in which case a MIDI Note OFF message instruction will be sent to the second microprocessor. If sense A is HIGH the software matches this against the previous key status held in memory to determine whether it is the first time that the key LOW status has been read for this key. If so then the timer counter is started for the key. If sense B is HIGH at this point then the program flow returns to scan the next key. If sense B is LOW, the key has reached the end of travel and is fully depressed. A MIDI Note ON message instruction is sent to the second microprocessor.

Figure 26:
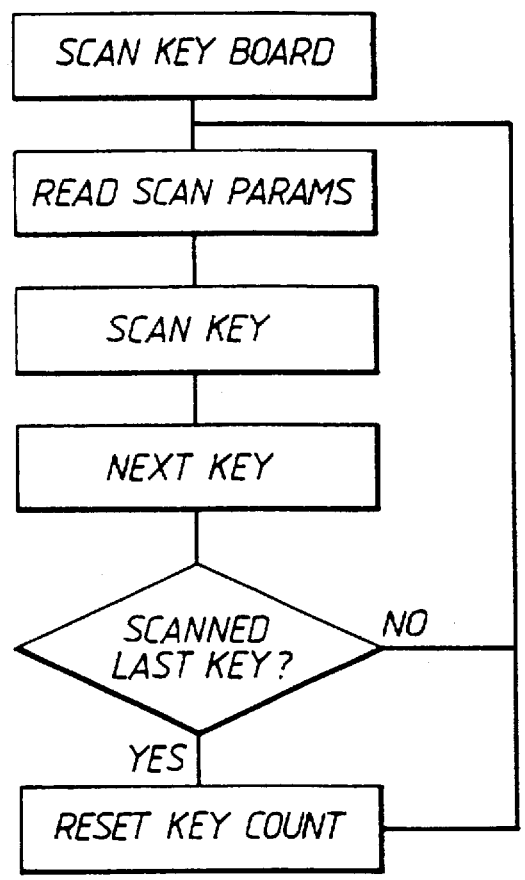

FIG. 26 illustrates the scenario for scanning the complete keyboard. Keyboard scanning commences, and the Select logic code for the first key is read from memory and output from the microprocessor 116. The operations in FIG. 25 are then carried out for the selected key. The Select Logic code for the next key is then read, and presented to the Select Logic circuit 112 and once again, the operations in FIG. 25 for the next key are carried out. This scanning procedure continues until all the keys have been scanned and the software logic then loops back to the first key to begin the whole cycle again. The microprocessor 116 must take less than, say, 12 microseconds to select and scan a single key, in order to produce a keyboard that is lively, responsive and enjoyable to play.

The keyboard device 100 is also provided with effect wheels 118 which are equipped with encoders to detect their motion. The encoders determine the degree by which the wheels 118 have been moved, and provide an analogue signal output. The encoders function in a similar manner to variable resistors or potentiometers, that is, when the potentiometer or resistance value changes the analogue voltage output is changed. Other technologies also exist, possibly providing some logical or digital output. If the analogue voltage system is utilised, the microprocessor 116 is equipped with the capability to handle these data. The wheels output is passed to an Analogue-to-Digital Converter (ADC) 119 for conversion from analogue to digital signals. These signals may then be presented directly to the microprocessor 116 and software when required. The software may then process the data in any prescribed manner, such as to produce pitch bend, modulation or other effects.

The analogue output from the effects wheels 118 as mentioned above is converted to digital form by the ADC 119. This interferes directly with the data and address busses of the microprocessor 116 which will service the output from the ADC 119 at regular intervals. Software defines the nature and effects assigned to the wheels. After reading the wheels and detecting if any movement has occurred since they were last read, then a suitable message will be sent to the second microprocessor 120, for output for example as a MIDI message.

The first microprocessor 116 communicates with the second microprocessor 120, which handles the conversion of key depression detection signals and generates output signals, for example, to produce MIDI notes. The microprocessor 120 software runs in a continuous loop. It monitors the input from the user data selection keypad 121, changes any internal data settings should a keypad button be depressed, outputs data to the user LCD interface 122, and outputs MIDI messages onto the MIDI network 126 via communication ports 125.

When the second microprocessor 120 receives a message from the first microprocessor 116, it converts the message into a message format as defined in the MIDI specification and puts the message into either a software or hardware queuing mechanism, which then eventually passes the message out to the MIDI network. As described above, messages received from the first microprocessor may include MIDI note ON, note OFF or effects wheel messages. The Velocity component of the message received from the first microprocessor is also used in MIDI Note ON and OFF messages to the MIDI network.

The MIDI network or sound source device 126 may comprise any number of MIDI compatible devices, such as synthesizers, sound modules, sequencers, drum machines, sound cards, sampler and lighting controllers. Each device knows how to react to the message it receives. A drum machine will of course produce different sounds to those produced by say a sound module, which may produce or play orchestral sounds only. The audio outputs of the MIDI sound source device 126 are attached to the amplifier 127, which in turn is attached to the loudspeaker 128. On receiving a MIDI Note ON message from the keyboard device 100, the sound source device 126 will produce some pre-defined audio sound signals which are sent to the amplifier 127 for amplification. The attached speaker 128 then reproduces the sounds for the listener. A MIDI Note OFF message will turn off the sound. The MIDI Velocity component of the MIDI message from the keyboard device 100 is interpreted by the sound source 126 as an indication as to how loud the sound is to be played. Each MIDI Note ON message contains a code relating to the name of the musical note to be produced by the sound source 126.

The key caps 102 of the keys 101 may be any suitable shape and some or all of them may have means for determining by touch the notes which the represent. Examples of this aspect are shown in FIGS. 27 to 33, in which the outer periphery of each key cap is hexagonal such that each key cap interfits with all adjacent key caps.

Figure 27:
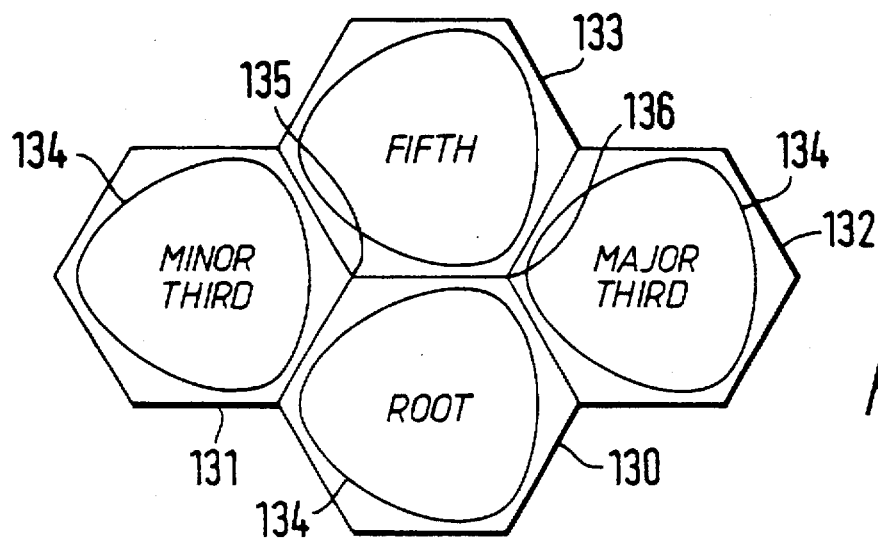
Figure 28:
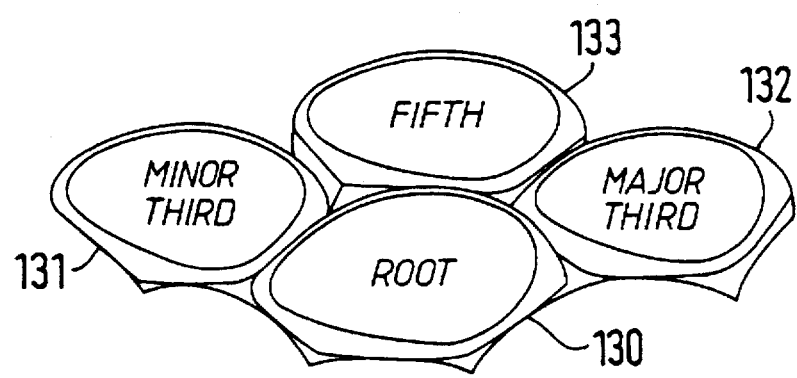
Figure 29A:
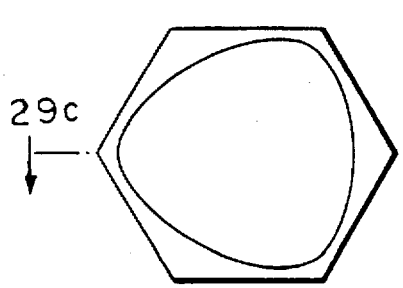
Figure 29B:
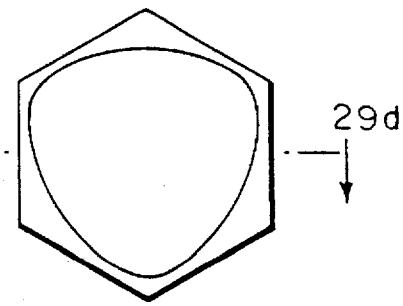
Figure 29C:
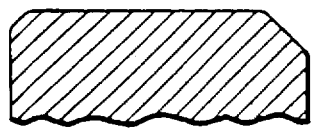
Figure 29D:
Figure 30:
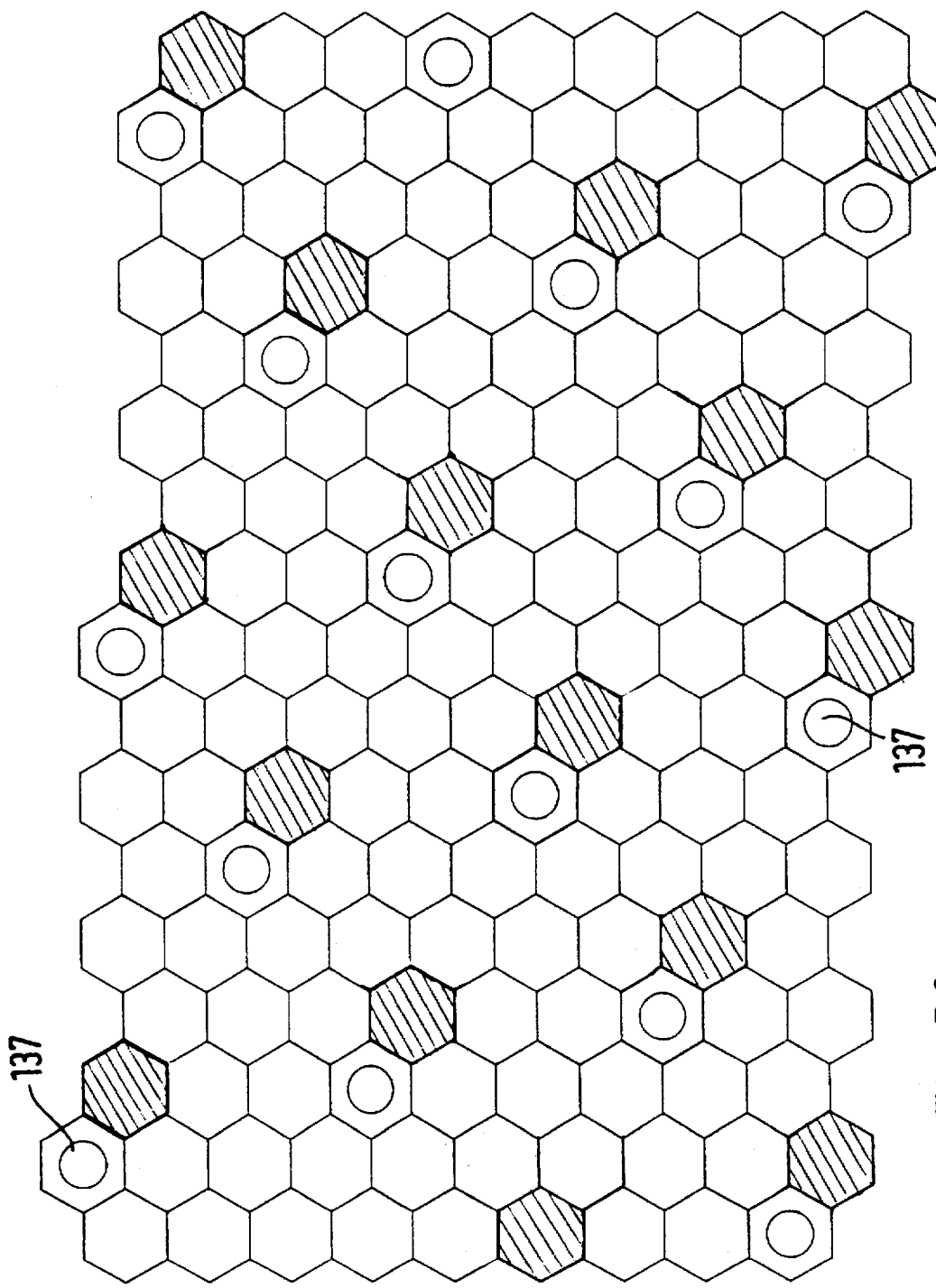
Figure 31A:
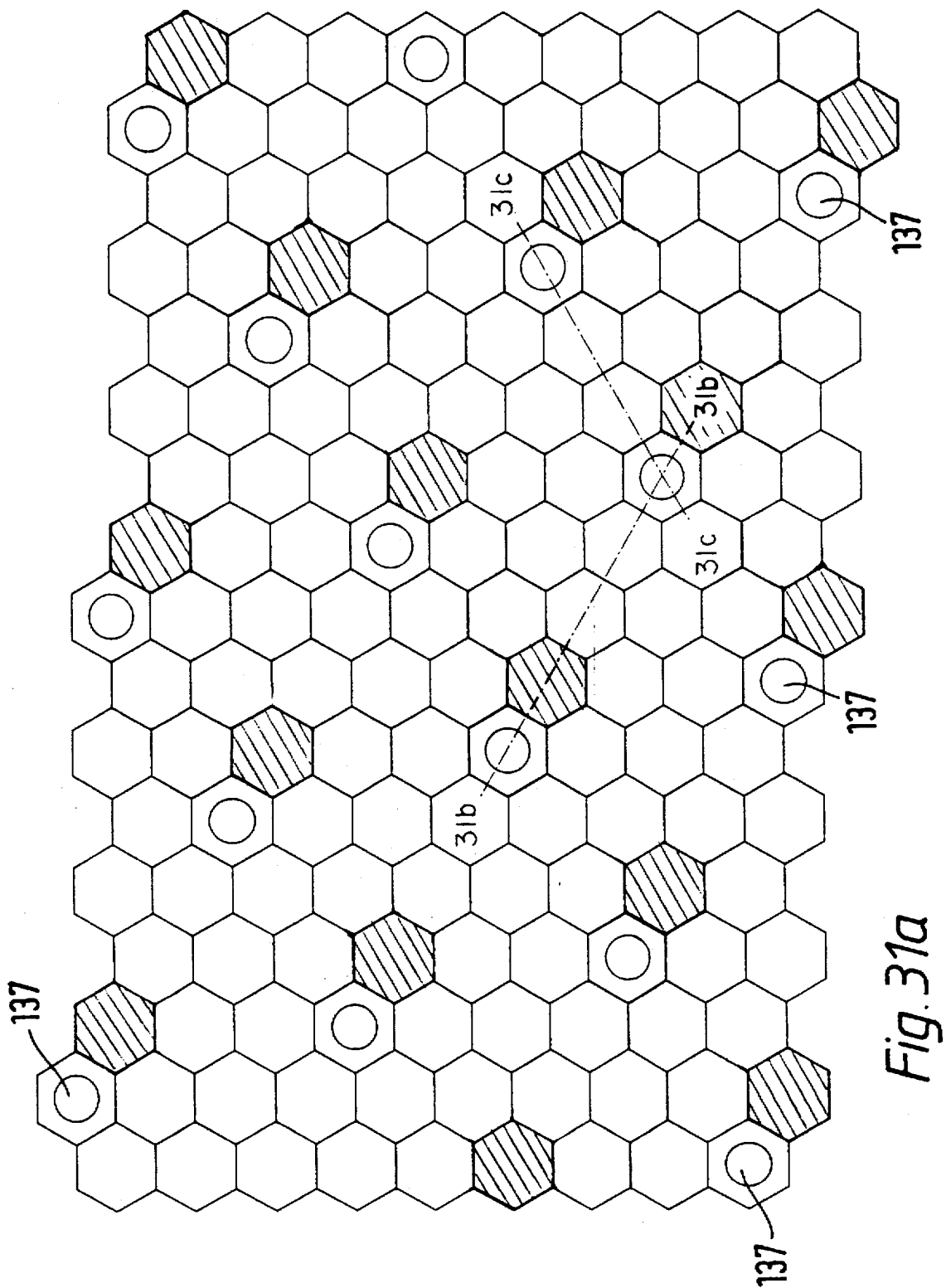

FIGS. 27 and 28 show the basic principal arrangement of notes in the keyboard lay-out of the present invention, with key 130 representing the root, the note represented by key 131 forming a minor third with the root, the note represented by key 132 forming a major third with the root, and the note represented by key 133 .forming a fifth with the root. By this arrangement, the keys 130, 131, 133 form a minor triad and the keys 130, 132, 133 form a major triad. The upper surfaces of key caps of these four keys are bevelled in a non-uniform manner around their peripheries 134, such that a relatively deep depression 135 is formed between keys 130, 131 and 133 for the minor triad and a relatively shallow depression 136 is formed between keys 130, 132 and 133 for the major triad. FIGS. 29a and 29b show plan and sectional views respectively of the key caps to illustrate the non-uniform bevelled periphery 134 thereof.

FIGS. 30, 31a, 31b and 31c show a simpler example of the keyboard, in which the upper surface of the caps representing each occurrence in the key lay-out of a chosen note is formed with a central depression 137 with the remaining key caps having substantially flat upper surfaces. This embodiment illustrates how the depressions 137 in the key caps determine specific intervals between the chosen notes.

Figure 33:
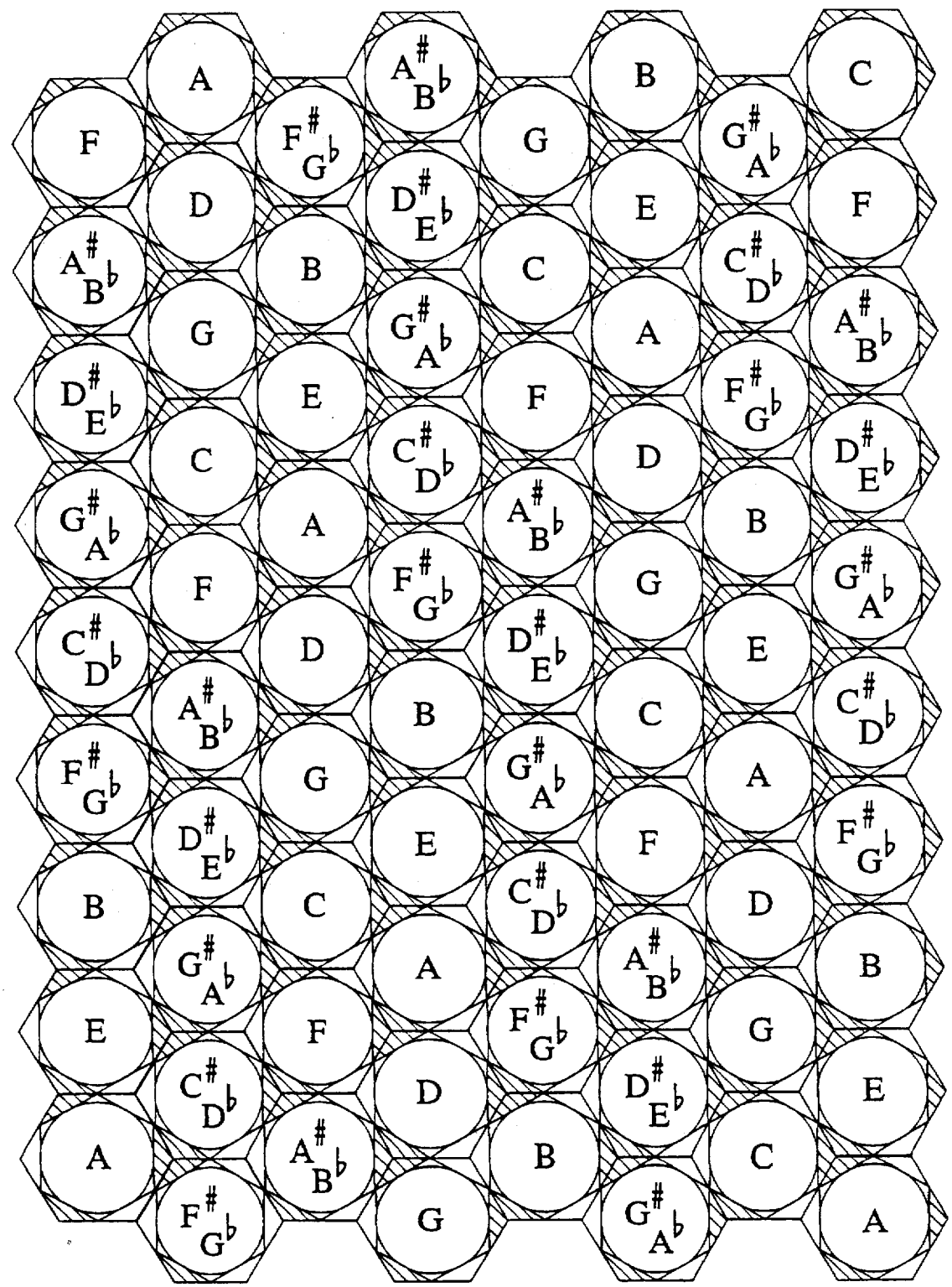

FIGS. 32a and 32b illustrate key caps having a combination of both non-uniform bevelled peripheries and central depressions; and FIG. 33 illustrates key caps having either a central circular upper flat surface, or depression, together with uniform bevelled peripheries.

Figure 34A:
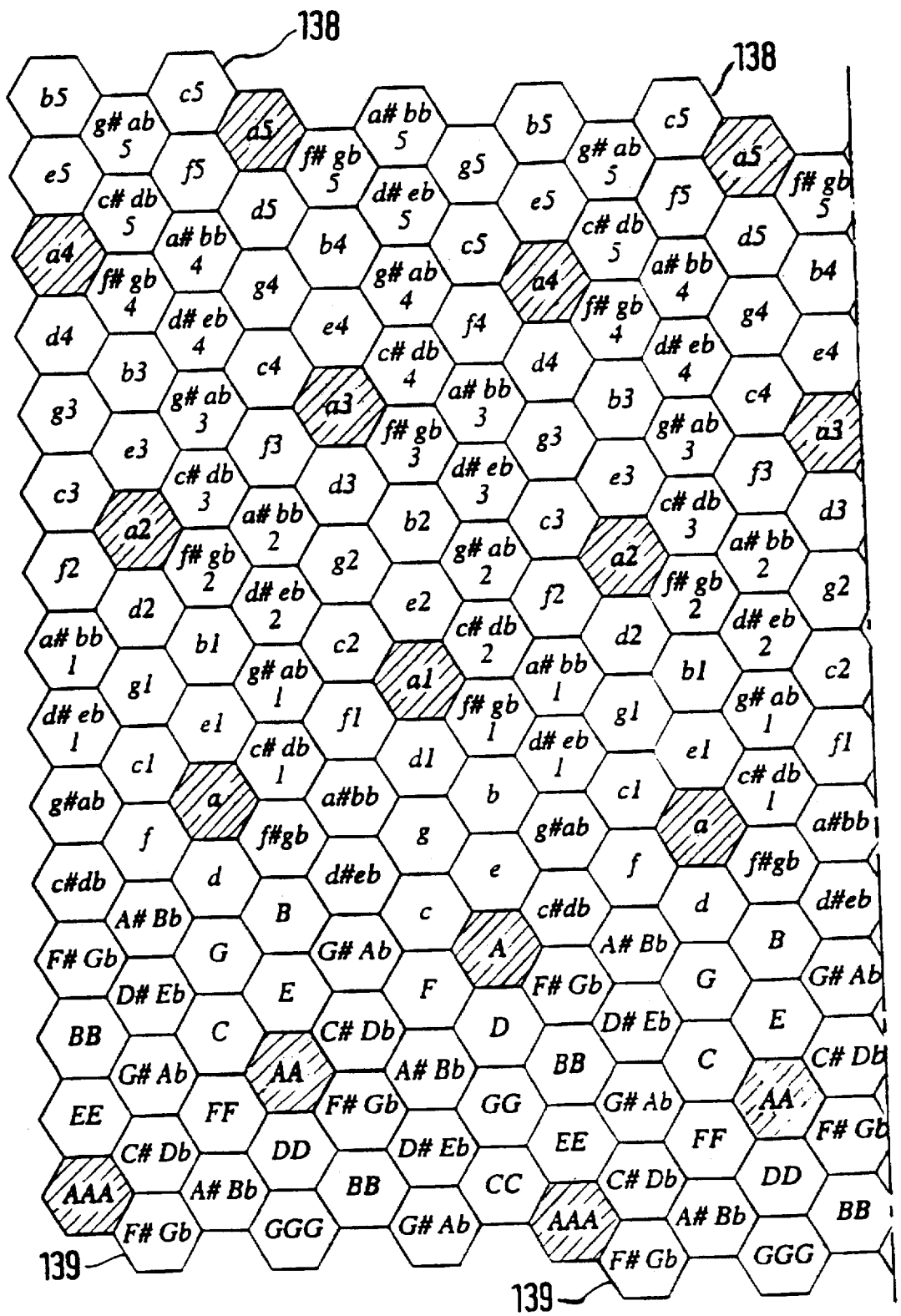
Figure 34B:
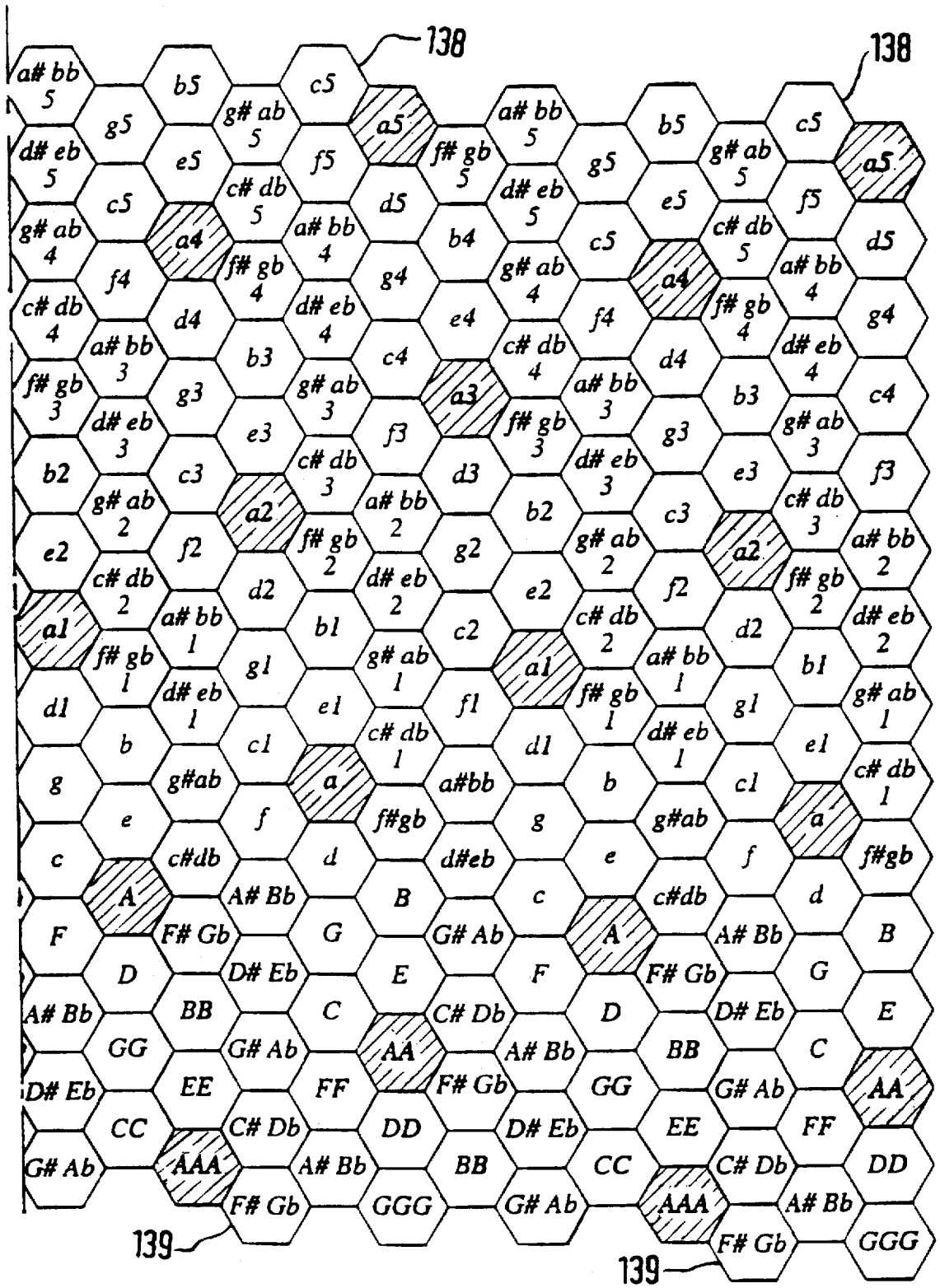
Figure 35:
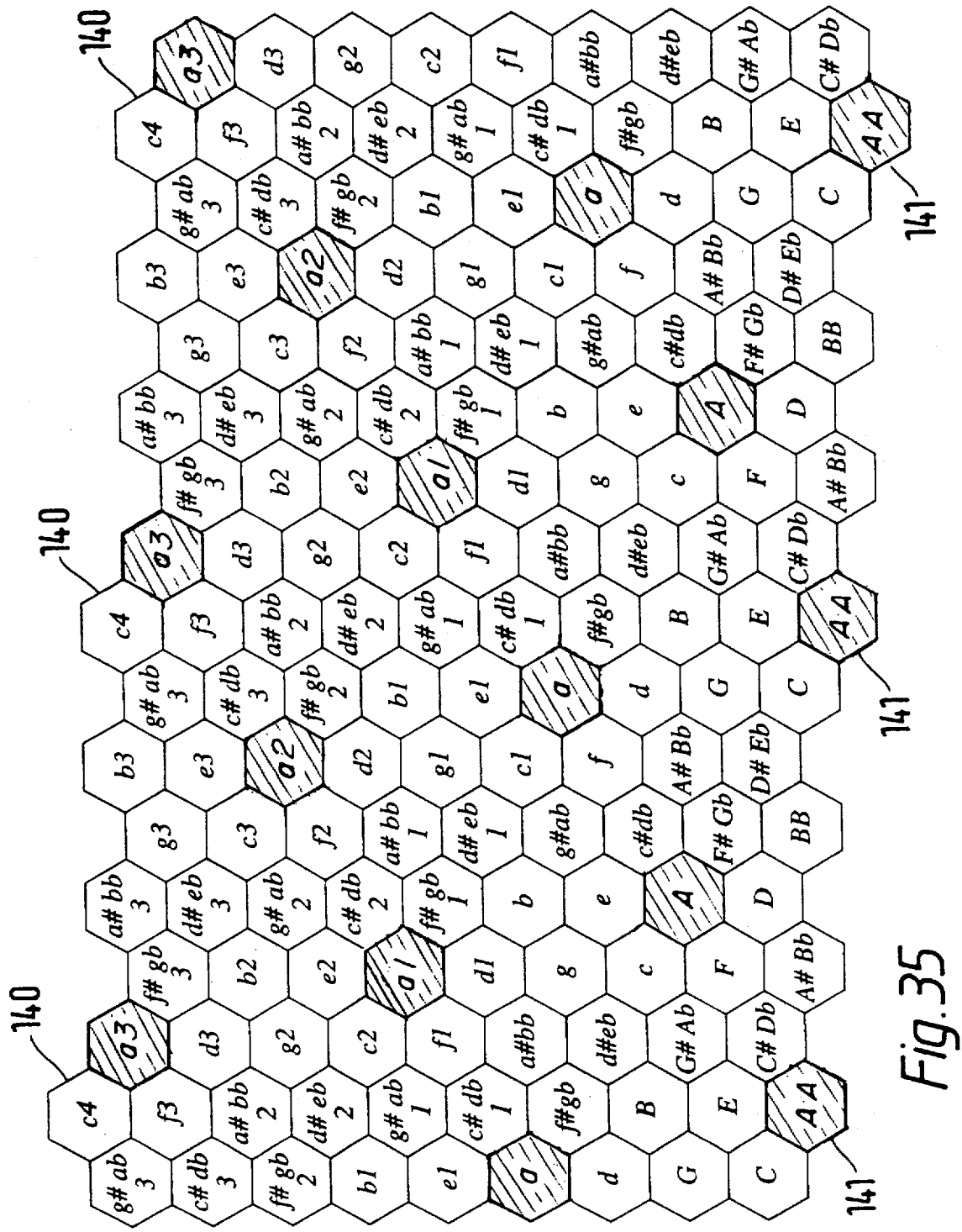

FIGS. 34 and 35 show two further examples of keyboards for use in the invention, in which additional partial rows of keys are included at the top and bottom edges of the array. More specifically, FIG. 34 shows an 8.5 Octave keyboard in which three partial rows are added to the top and bottom edges respectively such that the note 138 is repeated four times at the top edge and the note 139 is repeated four times at the bottom edge; and FIG. 35 shows a 5.25 Octave keyboard in which two partial rows are added at the top and bottom edges respectively such that the note 140 is repeated three times at the top edge and the note 141 is repeated three times at the bottom edge. These arrangements enable the whole range of notes to be reached with the user's left hand only on the left-hand side of the array and with the right hand only on the right-hand side of the array.

It can also be seen from FIGS. 30, 31a, 33, 34 and 35 that the keys can be arranged so that they are in generally vertical columns staggered relative to each other, rather than in horizontal rows. In these arrangements, for any given key, the keys immediately above and below it are touching, or at least relatively close to, the given key, and successive keys on any given horizontal line are separated by a whole or partial key width. The interval between any given key and the key directly above it in any given column is a fifth, whilst the two keys in the columns immediately on either side of the given column which lie between the given key and the key immediately above it form intervals of a minor third and a major third respectively with the given key. This basic arrangement of four adjacent keys is clearly shown in FIG. 27, with the "root" key 130 being the given key.

In the present application, the invention is intended to encompass other keyboard-type musical instruments, such as those comprising a generally continuous surface, as well as separate, individually movable keys. In this context, the term "key" is intended to include contact positions provided on such a continuous surface which, when pressed or otherwise contacted, activate a contact switch to produce a particular musical note.

What is claimed is:

1. A keyboard for a musical instrument, the keyboard comprising a plurality of keys arranged in a two-dimensional array and means associated with each key for producing a signal indicative of a particular musical note, said array consisting of parallel columns of said keys in which any given column is arranged relative to an adjacent column which is immediately to one side of said given column such that successive keys of said given column each lies between two successive keys of said adjacent column, and wherein said means associated with any given key of said given column are adapted to produce a signal indicative of a first musical note, said means associated with a key immediately above said given key of said given column are adapted to produce a signal indicative of a second musical note, and said means associated with keys which lie between said given key and the key immediately thereabove and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

2. A keyboard as claimed in claim 1, wherein each key is hexagonal in shape.

3. In an instrument for use in producing musical tones, a keyboard comprises a plurality of parallel columns of keys arranged in a two-dimensional array, the keys of adjacent columns being staggered relative to each other, and wherein said means associated with any given key of said given column are adapted to produce a signal indicative of a first musical note, said means associated with a key immediately above said given key of said given column are adapted to produce a signal indicative of a second musical note, and said means associated with keys which lie between said given key and the key immediately above it and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

4. A keyboard for a musical instrument, the keyboard comprising a plurality of keys arranged in a two-dimensional array and means associated with each key for producing a signal indicative of a particular musical note, said array consisting of parallel rows of said keys in which any given row is arranged relative to an adjacent row which is immediately to one side of said given row such that successive keys of said row each lies between two successive keys of said adjacent row, and wherein said means associated with successive keys of each row are adapted to produce signals indicative of successive semi-tones of a musical chromatic scale, said means associated with any given key of said given row being adapted to produce a signal indicative of a first semi-tone and said means associated with two successive keys of an adjacent row with said given key lying therebetween being adapted to produce signals indicative of second and third semi-tones respectively, such that musical intervals formed by said first and second semi-tones and said first and third semi-tones comprises a major third and a minor third respectively.

5. A keyboard according to claim 4, wherein the second and third semi-tones are fourth and fifth semi-tones respectively in a chromatic scale starting with said first semi-tone and increasing in pitch, and said given key of said given row is positioned between two further successive keys of another row which is immediately to another side of said given row, said means associated with said two further successive keys being adapted to produce signals indicative of fourth and fifth semi-tones respectively in a chromatic scale starting with said first semi-tone and decreasing in pitch.

6. A keyboard as claimed in claim 4, wherein each key is hexagonal in shape.

7. A keyboard as claimed in claim 4, wherein the rows form concentric circles.

8. In an instrument for use in producing musical tones, a keyboard comprises a plurality of parallel rows of keys arranged in a two-dimensional array, the keys of adjacent rows being staggered relative to each other, and means associated with each key for producing a signal indicative of a specific musical note, said means associated with any given key of any given row being arranged to produce a signal indicative of a first semi-tone and said means associated with two successive keys located either side of said given key in an immediately adjacent row being arranged to produce signals indicative of second and third semi-tones respectively forming musical intervals of a major third and a minor third with said first semi-tone.

9. In a keyboard for a musical instrument, comprising a plurality of keys arranged in a two-dimensional array and means associated with each key for producing a signal indicative of a particular musical note, the improvement, which enable groups of said keys producing the same musical note relationships in different musical keys to form the same visual configuration at respective locations within the array, consists of arranging said keys of said array in parallel columns in which any given column is arranged relative to an adjacent column which is immediately to one side of said given column such that successive keys of said given column each lies between two successive keys of said adjacent column, and wherein said means associated with any given key of said given column are adapted to produce a signal indicative of a first musical note, said means associated with a key immediately above said given key of said given column are adapted to produce a signal indicative of a second musical note, and said means associated with keys which lie between said given key and the key immediately thereabove and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

10. A keyboard-type musical instrument comprising a surface having a plurality of contact positions arranged in a two-dimensional array and means associated with each contact position for producing a signal indicative of a particular musical note, said array consisting of parallel columns of said contact positions in which any given column is arranged relative to an adjacent column which is immediately to one side of said given column such that successive contact positions of said given column each lies between two successive contact positions of said adjacent column, and wherein said means associated with any given contact position of said given column are adapted to produce a signal indicative of a first musical note, said means associated with a contact position immediately above said given contact position of said given column are adapted to produce a signal indicative of a second musical note, and said means associated with contact positions which lie between said given contact position and the contact position immediately thereabove and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

11. In an instrument for use in producing musical tones, a keyboard-type device comprises a surface having a plurality of parallel columns of contact positions arranged in a two-dimensional array, the contact positions of adjacent columns being staggered relative to each other, and wherein said means associated with any given contact position of said given column are adapted to produce a signal indicative of a first musical note, said means associated with a contact position immediately above said given contact position of said given column are adapted to produce a signal indicative of a second musical note, and said means associated with contact positions which lie between said given contact position and the contact position immediately thereabove and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

12. In a keyboard-type device for a musical instrument, comprising a plurality of contact positions arranged in a two-dimensional array and means associated with each contact position for producing a signal indicative of a particular musical note, the improvement, which enables groups of said contact positions producing the same musical note relationships in different musical keys to form the same visual configuration at respective locations within the array, consists of arranging said contact positions of said array in parallel columns in which any given column is arranged relative to an adjacent column which is immediately to one side of said given column such that successive contact positions of said given column each lies between two successive contact positions of said adjacent column, and wherein said means associated with any given contact position of said given column are adapted to produce a signal indicative of a first musical note, said means associated with a contact position immediately above said given contact position of said given column are adapted to produce a signal indicative of a second musical note, and said means associated with contact positions which lie between said given contact position and the contact position immediately thereabove and which are respectively in the adjacent columns on either side of the given column are adapted to produce signals indicative of a third and a fourth musical note respectively, and wherein the first and second musical notes form a musical interval of a fifth, the first and third musical notes form a musical interval of a minor third, and the first and fourth musical notes form a musical interval of a major third.

* * * * *